(12) United States Patent
Nakamoto et al.

(10) Patent No.: US 10,053,317 B2
(45) Date of Patent: Aug. 21, 2018

(54) CONTACT-AND-SEPARATION SYSTEM, IMAGE FORMING APPARATUS, AND CONTACT-AND-SEPARATION METHOD

(71) Applicants: Shogo Nakamoto, Kanagawa (JP); Takeo Seki, Kanagawa (JP); Takuya Murata, Tokyo (JP); Shogo Sakamoto, Kanagawa (JP)

(72) Inventors: Shogo Nakamoto, Kanagawa (JP); Takeo Seki, Kanagawa (JP); Takuya Murata, Tokyo (JP); Shogo Sakamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/662,538

(22) Filed: Jul. 28, 2017

(65) Prior Publication Data
US 2018/0039221 A1 Feb. 8, 2018

(30) Foreign Application Priority Data

Aug. 8, 2016 (JP) .................................. 2016-155967
Jun. 14, 2017 (JP) .................................. 2017-117107

(51) Int. Cl.
*B65H 5/02* (2006.01)
*B65H 5/04* (2006.01)
(Continued)

(52) U.S. Cl.
CPC ........... *B65H 5/025* (2013.01); *G03G 15/754* (2013.01); *G03G 15/757* (2013.01); *G05B 11/18* (2013.01);
(Continued)

(58) Field of Classification Search
CPC . B65H 5/00; B65H 5/02; B65H 5/021; B65H 5/025; B65H 2403/25;
(Continued)

(56) References Cited

U.S. PATENT DOCUMENTS 5,193,801 A * 3/1993 Coombs ................. B65H 39/11
271/293
5,291,252 A * 3/1994 Kawaishi ........... G03G 15/0131
399/301
(Continued)

FOREIGN PATENT DOCUMENTS

JP 2012-118200 6/2012
JP 2015-135394 7/2015
(Continued)

*Primary Examiner* — Prasad V Gokhale
(74) *Attorney, Agent, or Firm* — Harness, Dickey & Pierce, P.L.C.

(57) ABSTRACT

A contact-and-separation system includes a first roller, a second roller, and a contact-and-separation device. The first roller contacts a belt. The second roller is opposed to the first roller. The contact-and-separation device contacts or separates the belt to or from the second roller via a sheet conveyed. The contact-and-separation device includes an eccentric cam, a motor, and a circuitry. The eccentric cam is mounted on an end of a rotation shaft of the first roller. The motor rotates the eccentric cam. The circuitry controls the motor to rotate the eccentric cam to contact or separate the belt to or from the second roller via the sheet conveyed. The circuitry controls the motor to decelerate a rotation speed of the motor on contact or separation of the belt to or from the second roller between the first roller and the second roller.

18 Claims, 15 Drawing Sheets

(51) Int. Cl.
*G03G 15/00* (2006.01)
*G05B 11/18* (2006.01)
*G05B 11/42* (2006.01)
*H02P 6/16* (2016.01)
*H02K 7/116* (2006.01)

(52) U.S. Cl.
CPC .............. *G05B 11/42* (2013.01); *H02K 7/116* (2013.01); *H02P 6/16* (2013.01); *B65H 2403/25* (2013.01); *B65H 2403/512* (2013.01); *B65H 2403/514* (2013.01); *B65H 2404/1452* (2013.01); *B65H 2404/255* (2013.01); *B65H 2404/262* (2013.01); *B65H 2513/222* (2013.01); *G05B 2219/41021* (2013.01); *G05B 2219/41321* (2013.01)

(58) Field of Classification Search
CPC .......... B65H 2403/51; B65H 2403/512; B65H 2403/514; B65H 2404/144; B65H 2404/1441; B65H 2404/1452; B65H 2404/255; B65H 2404/262; B65H 2513/20; B65H 2513/21; B65H 2513/212; B65H 2513/22; B65H 2513/222; G03G 15/754
See application file for complete search history.

(56) References Cited

U.S. PATENT DOCUMENTS

| | | | | |
|---|---|---|---|---|
| 6,606,475 | B1* | 8/2003 | Maier | G03G 15/1665 |
| | | | | 399/302 |
| 6,697,596 | B2* | 2/2004 | Bessho | G03G 15/1615 |
| | | | | 399/302 |
| 2004/0252354 | A1* | 12/2004 | Shimizu | B65H 5/06 |
| | | | | 358/496 |
| 2011/0222920 | A1* | 9/2011 | Kobayashi | G03G 15/0194 |
| | | | | 399/299 |
| 2011/0266990 | A1 | 11/2011 | Murata et al. | |
| 2013/0078021 | A1 | 3/2013 | Sakamoto et al. | |
| 2014/0312819 | A1 | 10/2014 | Murata et al. | |
| 2015/0110525 | A1 | 4/2015 | Sakamoto et al. | |
| 2015/0360892 | A1 | 12/2015 | Yoshimizu | |
| 2015/0372630 | A1* | 12/2015 | Ishikawa | H02P 21/141 |
| | | | | 318/400.02 |
| 2016/0248360 | A1 | 8/2016 | Seki | |
| 2016/0347560 | A1* | 12/2016 | Murata | B65H 3/0669 |

FOREIGN PATENT DOCUMENTS

| | | |
|---|---|---|
| JP | 2016-003085 | 1/2016 |
| JP | 2016-158376 | 9/2016 |

* cited by examiner

THRESHOLD DETERMINATION

AREA DETERMINATION (OF SPECIFIC RANGE)

THRESHOLD DETERMINATION

AREA DETERMINATION (OF SPECIFIC RANGE)

CONTACT-AND-SEPARATION SYSTEM, IMAGE FORMING APPARATUS, AND CONTACT-AND-SEPARATION METHOD

CROSS-REFERENCE TO RELATED APPLICATIONS

This patent application is based on and claims priority pursuant to 35 U.S.C. § 119(a) to Japanese Patent Application Nos. 2016-155967, filed on Aug. 8, 2016, and 2017-117107, filed on Jun. 14, 2017 in the Japan Patent Office, the entire disclosure of each of which is hereby incorporated by reference herein.

BACKGROUND

Technical Field

Aspects of the present disclosure relate to a contact-and-separation system, an image forming apparatus incorporating the contact-and-separation system, and a contact-and-separation method.

Related Art

An image forming apparatus may include a contact-and-separation device to contact or separate a roller and a belt relative to a transfer device, to reduce shock jitter in which the speed of the roller or the belt greatly decreases for a moment. For example, a stepping motor is used as a drive motor to drive the contact-and-separation device. The contact-and-separation device of the transfer device may be referred to as a secondary transfer contact-and-separation device. In such a case, for example, the roller causing shock jitter is a secondary transfer roller (disposed at a side opposite at a contact side) and the belt is an intermediate transfer belt.

SUMMARY

In an aspect of the present disclosure, there is provided a contact-and-separation system that includes a first roller, a second roller, and a contact-and-separation device. The first roller contacts a belt. The second roller is opposed to the first roller. The contact-and-separation device contacts or separates the belt to or from the second roller via a sheet conveyed. The contact-and-separation device includes an eccentric cam, a motor, and a circuitry. The eccentric cam is mounted on an end of a rotation shaft of the first roller. The motor rotates the eccentric cam. The circuitry controls the motor to rotate the eccentric cam to contact or separate the belt to or from the second roller via the sheet conveyed. The circuitry controls the motor to decelerate a rotation speed of the motor on contact or separation of the belt to or from the second roller between the first roller and the second roller.

In another aspect of the present disclosure, there is provided an image forming apparatus that includes the contact-and-separation system and the central processing unit.

In still another aspect of the present disclosure, there is provided a method of contacting and separating a belt contacting a first roller to and from a second roller opposed to the first roller. The method includes controlling a motor to rotate an eccentric cam to contact or separate the belt to or from the second roller via a sheet conveyed, and decelerating a rotation speed of the motor on contact or separation of the belt to or from the second roller between the first roller and the second roller.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2A is the perspective view of a contraction state of a counter bearing with an intermediate transfer belt and a secondary transfer roller separated from each other, FIG. 2B is the perspective view of a rotation position of an eccentric cam with the intermediate transfer belt and the secondary transfer roller separated from each other, FIG. 2C is the perspective view of an expansion state of the counter bearing with the intermediate transfer belt and the secondary transfer roller contacting each other, and FIG. 2D is the perspective view of a rotation position of the eccentric cam with the intermediate transfer belt and the secondary transfer roller contacting each other;

FIG. 3A is a perspective view of a state of the rotation position detector when the secondary transfer contact-and-separation device contacts the intermediate transfer belt with an intermediate transfer repulsion roller and the secondary transfer roller, and FIG. 3B is a perspective view of a state of the rotation position detector when the secondary transfer contact-and-separation device separates the intermediate transfer belt from the intermediate transfer repulsion roller and the secondary transfer roller;

FIG. 4A is a flowchart of an example of control processing of the secondary transfer contact-and-separation device with the controller, and FIG. 4B is a chart of relationship between time and voltage regarding a determination timing of determining a stop position of the eccentric cam during separation of the secondary transfer contact-and-separation device;

FIG. 5A is a flowchart of another example of control processing of the secondary transfer contact-and-separation device with the controller, and FIG. 5B is a flowchart of details of test driving of the secondary transfer contact-and-separation device at an initial stage of the control processing of FIG. 5A;

FIG. 7A is a characteristic diagram of a variation waveform of the DC motor over time, FIG. 7B is a graph of threshold determination at a specific range, and FIG. 7C is a graph of area determination at the specific range;

FIG. 13A is an illustration of a home position of the eccentric cam and the secondary transfer roller during separation in the first embodiment, FIG. 13B is an illustration of a home position of an eccentric cam according to one example of the second embodiment and the secondary transfer roller during separation and a load variation detection position on determination of the home position, FIG. 13C is an illustration of a home position of an eccentric cam according to another example of the second embodiment and the secondary transfer roller during separation and a load variation detection position on determination of the home position, and FIG. 13D is an illustration of a home position of an eccentric cam according to still another example of the second embodiment and the secondary transfer roller during separation and a load variation detection position on determination of the home position;

FIG. 15A is a characteristic diagram of a variation waveform of the DC motor relative to time, FIG. 15B is a graph of threshold determination at a specific range, and FIG. 15C is a graph of area determination at a specific range;

FIG. 18A is a graph of a case in which the home position of the secondary transfer contact-and-separation device according to the first embodiment deviates, and FIG. 18B is a graph of a case in which the home position of the secondary transfer contact-and-separation device according to the second embodiment is fixed at one point, in comparison with the secondary transfer contact-and-separation device according to the first embodiment.

Figure 1:
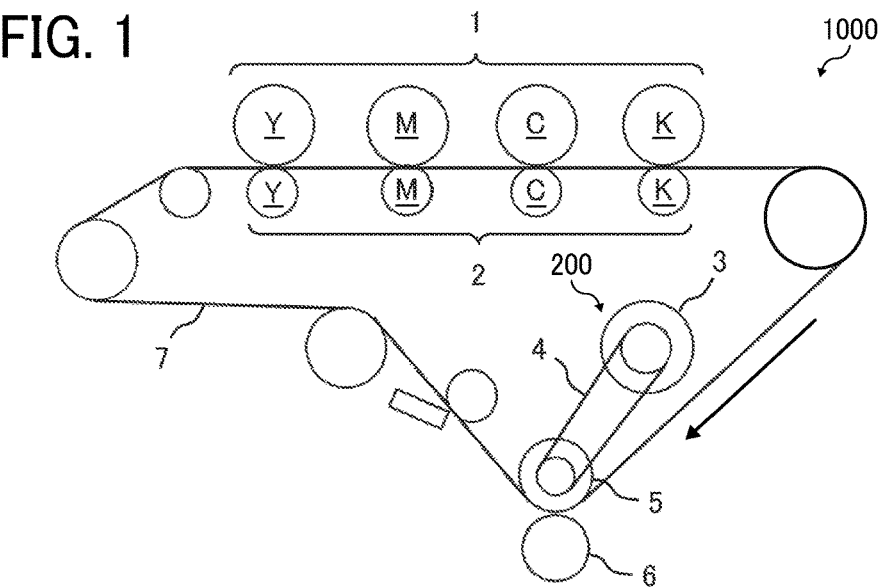
FIG. 1 is a schematic view of a configuration of an image forming apparatus including a secondary transfer contact-and-separation device according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Example embodiments of the present disclosure are hereinafter described. However, embodiments of the present disclosure are not limited to the embodiments described below. Similar elements illustrated in respective figures referred to herein are given similar reference numbers. The same description for the same elements is not repeated where appropriate.

Below, a contact-and-separation device, a contact-and-separation system, an image forming apparatus including the contact-and-separation system, and a contact-and-separation method according to example embodiments of the present disclosure are described with reference to drawings.

First Embodiment

FIG. 1 is a schematic view of a configuration of an image forming apparatus 1000 including a secondary transfer contact-and-separation device 200 according to a first embodiment of the present disclosure.

In FIG. 1, the image forming apparatus 1000 is illustrated as a digital multifunction peripheral (MFP) that performs a plurality of functions of, for example, a printer, a copier, a scanner, and a facsimile machine, in a single housing. In FIG. 1 is illustrated an intermediate transfer unit including a transfer device 1 around a secondary transfer roller 6

The intermediate transfer unit includes four color tandem-type transfer devices 1. As the transfer devices 1, photoconductor drums being four development rotators corresponding to four color toners of black (K), cyan (C), magenta (M), and yellow (Y) are disposed side by side on the same plane to obtain a color image. The intermediate transfer unit further includes primary transfer rollers 2 to superimpose and transfer toner images, which are formed on the photoconductor drums with developing devices, onto an outer surface on an intermediate transfer belt 7 in offset manner. The intermediate transfer unit secondarily transfers the toner images, which are transferred on the intermediate transfer belt 7, onto a recording medium with an intermediate transfer repulsion roller 5 and the secondary transfer roller 6. A belt 4 is looped around rotation shafts of the intermediate transfer repulsion roller 5 and the secondary transfer roller 6. The intermediate transfer repulsion roller 5 and the secondary transfer roller 6 are rotated with the rotation drive of a direct current (DC) motor 3, which is transmitted to the intermediate transfer repulsion roller 5 and the secondary transfer roller 6 via the belt 4. Here, the recording medium used herein is a generic term of various types of sheets, such as sheet of paper, a coated sheet of paper, label sheet, overhead projector (OHP) sheet, and film. Hereinafter, the recording medium is regarded as a sheet. As described later, the DC motor 3 and the intermediate transfer repulsion roller 5 are includes in the secondary transfer contact-and-separation device 200 that contact or separate the secondary transfer roller 6 and the intermediate transfer belt 7.

In the secondary transfer unit as described above, it is preferable to keep the speed of the intermediate transfer belt 7 constant. However, torque load occurs in the intermediate transfer belt 7 due to an impact of entry or departure of a sheet into or from a contact portion (nip portion) of the intermediate transfer repulsion roller 5 and the secondary transfer roller 6 for secondary transfer. Accordingly, a speed difference may occur between the intermediate transfer belt 7 and each photoconductor drum. Such a speed difference may cause uneven image densities of lateral streak pattern in a printed image on the sheet, thus causing defective printing. The phenomenon that the speed of the secondary transfer roller 6 or the intermediate transfer belt 7 greatly decreases for a moment to cause such an abnormal image is referred to as shock jitter. Hence, the secondary transfer contact-and-separation device 200 is disposed to reduce the shock jitter.

Figure 2A:
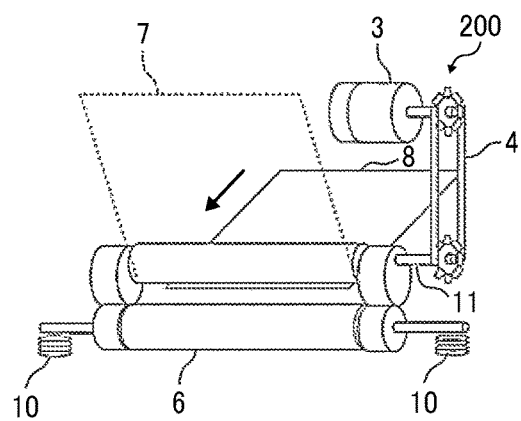
FIGS. 2A through 2D are perspective views of a configuration of the secondary transfer contact-and-separation device disposed in a transfer device of the image forming apparatus illustrated in FIG. 1, more specifically.
Figure 2B:
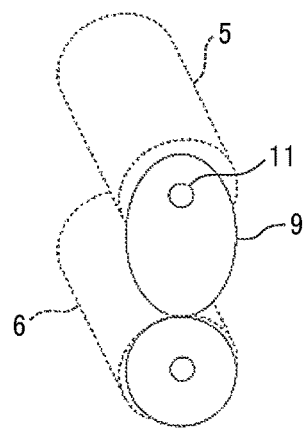
Figure 2C:
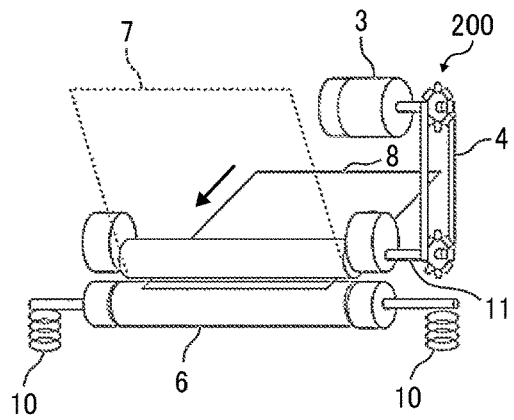
Figure 2D:
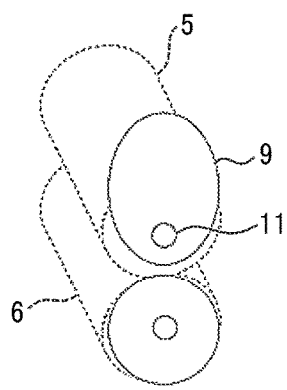

FIGS. 2A and 2B are perspective views of a schematic configuration of the secondary transfer contact-and-separation device 200 in the transfer device 1 of the image forming apparatus 1000. FIG. 2A is the perspective view of a contraction state of a counter bearing 10 with the intermediate transfer belt 7 and the secondary transfer roller 6 separated from each other. FIG. 2B is the perspective view of a rotation position of an eccentric cam 9 with the intermediate transfer belt 7 and the secondary transfer roller 6 separated from each other. FIG. 2C is the perspective view of an expansion state of the counter bearing 10 with the intermediate transfer belt 7 and the secondary transfer roller 6 contacting each other. FIG. 2D is the perspective view of a rotation position of the eccentric cam 9 with the intermediate transfer belt 7 and the secondary transfer roller 6 contacting each other.

As illustrated in FIG. 2A, in the secondary transfer contact-and-separation device 200, a controller (generally, a printer controller having a function of a central processing unit (CPU)) drives the DC motor 3 slightly before a sheet 8 exits. The belt 4 and a rotation shaft 11 of the intermediate transfer repulsion roller 5 are rotated with the drive force of the DC motor 3, thus rotating the eccentric cam 9 secured to the rotation shaft 11. With the rotation, the eccentric cam 9 pushes down the counter bearing 10 being a spring, thus separating the secondary transfer roller 6 from the intermediate transfer belt 7 (hereinafter, similarly, the secondary transfer contact-and-separation device 200 may be regarded to include the intermediate transfer repulsion roller 5). At this time, regarding the rotation position of the eccentric cam 9, as illustrated in FIG. 2B, the long diameter stands upright and the eccentric cam 9 contacts an end of the secondary transfer roller 6. Thus, the impact on the exit of the sheet 8 can be reduced.

As illustrated in FIG. 2C, in the secondary transfer contact-and-separation device 200, the eccentric cam 9 rotates similarly with the above-described case slightly after the entry of the sheet 8. Accordingly, the eccentric cam 9 separates from the counter bearing 10, and the secondary transfer roller 6 and the intermediate transfer belt 7 contact each other. At this time, regarding the rotation position of the eccentric cam 9, as illustrated in FIG. 2D, the long diameter stands upright and the eccentric cam 9 separates from the end of the secondary transfer roller 6. Thus, the impact on the entry of the sheet 8 can be reduced. That is, the secondary transfer contact-and-separation device 200 has a basic function to contact or separate the intermediate transfer belt 7 relative to the secondary transfer roller 6 opposing the intermediate transfer repulsion roller 5, which the intermediate transfer belt 7 contacts, via the sheet 8 conveyed. Here, the intermediate transfer repulsion roller 5 may be assumed to be a first roller, and the secondary transfer roller 6 may be assumed to be a second roller. The eccentric cam 9 mounted on ends of the rotation shaft 11 of the intermediate transfer repulsion roller 5 rotates with power of the DC motor 3 controlled by the controller. The eccentric cam 9 is typically mounted on both axial ends of the rotation shaft 11. However, the eccentric cam 9 may be mounted on one axial end of the rotation shaft 11. The rotation of the eccentric cam 9 causes the intermediate transfer belt 7 to contact or separate from the secondary transfer roller 6 via the sheet 8 conveyed.

The secondary transfer contact-and-separation device 200 can reduce shock jitter due to an impact of a sheet entering or exiting from the contact portion (nip portion) of the intermediate transfer repulsion roller 5 and the secondary transfer roller 6. However, an impact on the contact or separation of the secondary transfer roller 6 and the intermediate transfer belt 7 might occur as a new source of shock jitter, thus adversely worsening the shock jitter. Hence, in the secondary transfer contact-and-separation device 200 according to the first embodiment, the DC motor 3 capable of controlling the rotation speed and the rotation angle in feedback manner with the controller is employed as a drive source. Accordingly, in the secondary transfer contact-and-separation device 200, the controller adjusts the rotation speed and the rotation angle of the DC motor 3 through the feedback control, to change the rotation position of the eccentric cam 9 and the contact and separation speeds of the secondary transfer roller 6 and the intermediate transfer repulsion roller 5 relative to the intermediate transfer belt 7 therebetween. The controller decelerates the rotation speed of the DC motor 3 when the intermediate transfer belt 7, which is disposed between the intermediate transfer repulsion roller 5 and the secondary transfer roller 6 opposing each other, separates from or contacts the intermediate transfer repulsion roller 5 and the secondary transfer roller 6. Accordingly, the impact on separation or contact of the intermediate transfer belt 7 between the secondary transfer roller 6 and the intermediate transfer repulsion roller 5 can be cushioned, thus reducing shock jitter. Note that the configuration of the secondary transfer contact-and-separation device 200 and the controller can be regarded as a secondary transfer contact-and-separation system.

Figure 3A:
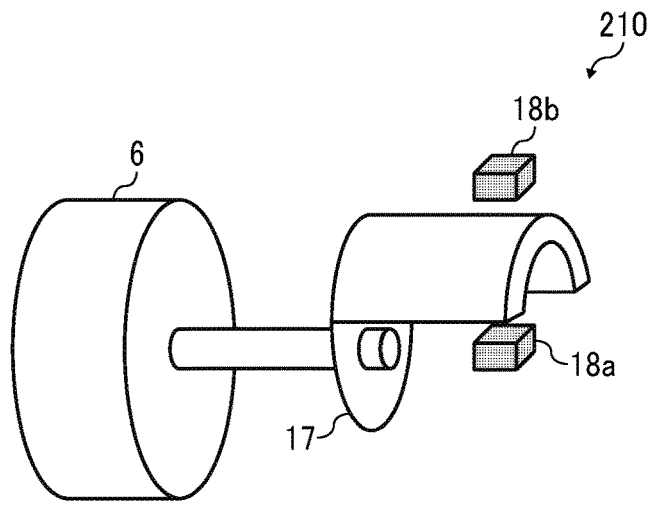
FIGS. 3A and 3B are schematic views of a rotation position detector mounted on a shaft of the secondary transfer roller of the secondary transfer contact-and-separation device of FIGS. 2A through 2D, more specifically.
Figure 3B:
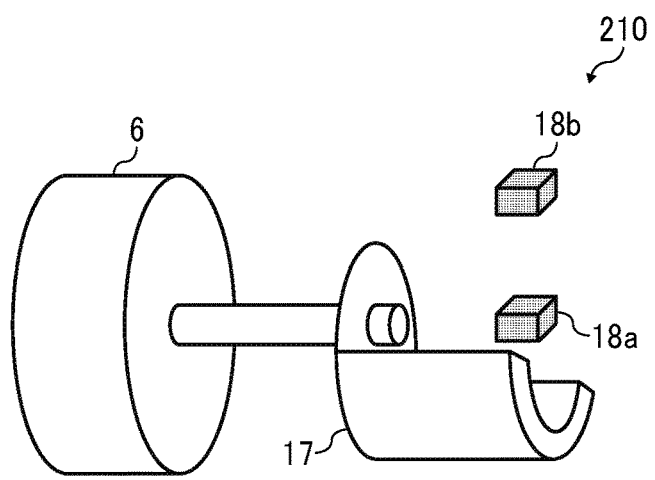

FIGS. 3A and 3B are schematic views of a rotation position detector 210 mounted on a shaft of the secondary transfer roller 6 of the secondary transfer contact-and-separation device 200. FIG. 3A is a perspective view of a state of the rotation position detector 210 when the secondary transfer contact-and-separation device 200 contacts the intermediate transfer belt 7 with the intermediate transfer repulsion roller 5 and the secondary transfer roller 6. FIG. 3B is a perspective view of a state of the rotation position detector 210 when the secondary transfer contact-and-separation device 200 separates the intermediate transfer belt 7 from the intermediate transfer repulsion roller 5 and the secondary transfer roller 6.

With reference to FIGS. 3A and 3B, the rotation position detector 210 includes a feeler 17, a light-emitting element 18a, and a light-receiving element 18b. The feeler 17 is mounted on one end of a shaft of the secondary transfer roller 6. The light-emitting element 18a and the light-receiving element 18b are optical elements disposed opposite to each other via a position at which the feeler 17 passes while rotating. The example of FIG. 3A corresponds to a state in which the intermediate transfer belt 7 contacts the secondary transfer roller 6 and the intermediate transfer repulsion roller 5 between the secondary transfer roller 6 and the intermediate transfer repulsion roller 5. In such a case, since the light emitted from the light-emitting element 18a is blocked with a semi-cylindrical body of the feeler 17 and is not detected with the light-receiving element 18b, the controller determines that the feeler 17 is present. The example of FIG. 3B corresponds to a state in which the intermediate transfer belt 7 is separated from the secondary transfer roller 6 and the intermediate transfer repulsion roller 5. In such a case, since the light emitted from the light-emitting element 18a is not blocked with a semi-cylindrical body of the feeler 17 and is detected with the light-receiving element 18b, the controller determines that the feeler 17 is absent. Thus, the controller determines the presence or absence of the feeler 17 and determines a stop position (rotation position) of the eccentric cam 9 at a predetermined timing.

Figure 4A:
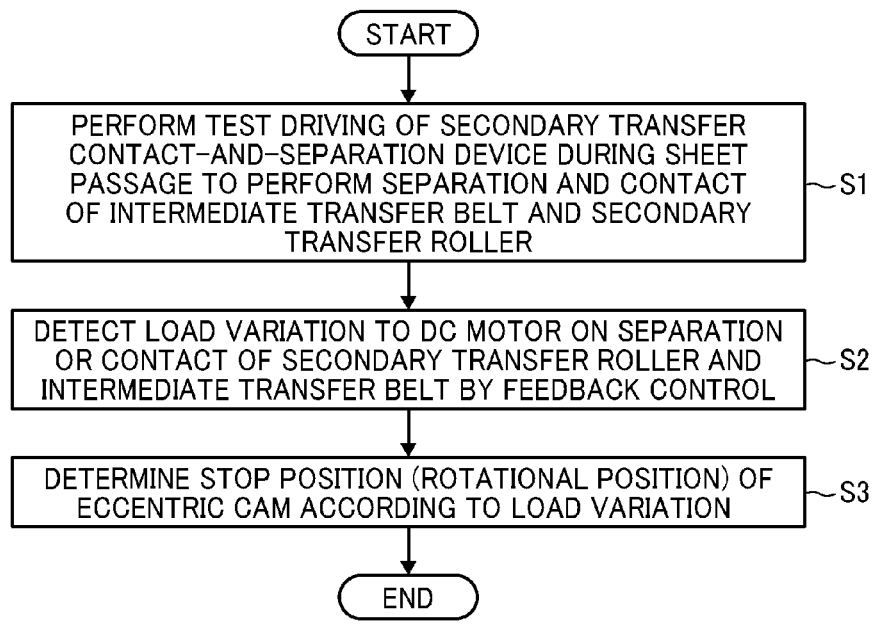
FIGS. 4A and 4B are charts of an example of operation processing in the secondary transfer contact-and-separation device when a direct current (DC) motor is driven with a controller of the image forming apparatus of FIG. 1, more specifically.
Figure 4B:
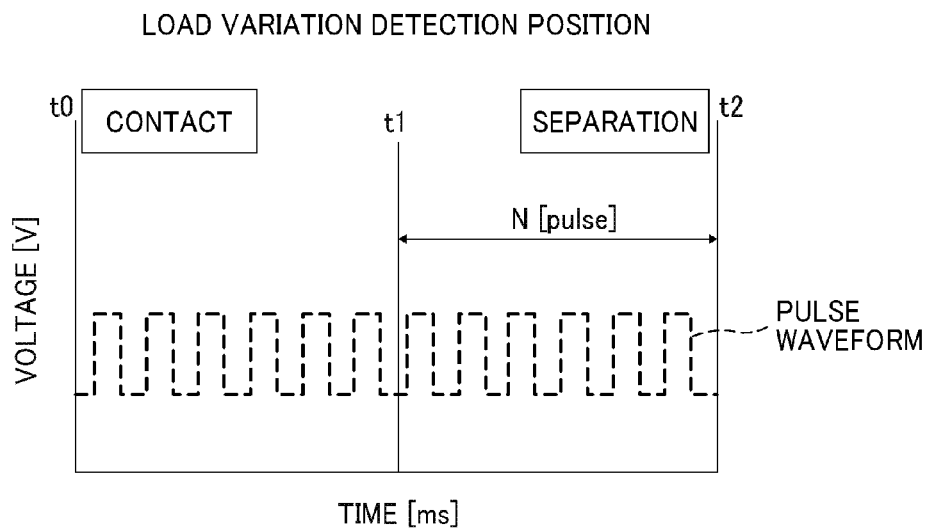

FIGS. 4A and 4B are charts of an example of operation processing in the secondary transfer contact-and-separation device 200 when the DC motor 3 is driven with the controller in the image forming apparatus 1000. FIG. 4A is a flowchart of an example of control processing of the secondary transfer contact-and-separation device 200 with the controller. FIG. 4B is a chart of relationship between time [ms] and voltage [V] regarding a determination timing of determining the stop position (rotation position) of the eccentric cam 9 during separation of the secondary transfer contact-and-separation device.

For the example of FIG. 4A, the control processing of the secondary transfer contact-and-separation device 200 is performed to cushion the impact on contact or separation of the intermediate transfer belt 7 and the secondary transfer roller 6. Therefore, during passage of a sheet, the secondary transfer contact-and-separation device 200 is preliminarily driven to separate and contact the intermediate transfer belt 7 and the secondary transfer roller 6 relative to each other (step S1). The controller detects a variation in load applied to the DC motor 3 on separation or contact of the secondary transfer roller 6 and the intermediate transfer belt 7 by feedback control (step S2). Note that examples of the load variation of a feedback value obtained from the feedback control include current value, speed error, positional error, pulse width modulation (PWM), and torque. The controller determines the stop position (rotation position) of the eccentric cam 9 according to the load variation detected with the DC motor 3 (step S3). Note that the rotary direction of the eccentric cam 9 at this time can be any direction of forward rotation operation and reverse rotation operation. The physical quantity of the eccentric cam 9 contributes to a home position of separation.

With reference to FIG. 4B, in the control of transition from the contact state at time t0 to the separation state at time t1, the controller detects the load variation on separation at time t1, activates the eccentric cam 9 for N pulses from the detection, and stops the eccentric cam 9 at the home position of the separation state at time t2. Note that, at time t1, the distance between the secondary transfer roller 6 and the intermediate transfer repulsion roller 5 is 0 mm, which corresponds to a load variation detection position. After the eccentric cam 9 is driven for a predetermined number of pulses N from the load variation detection position, the control of stopping the eccentric cam 9 is started.

Figure 5A:
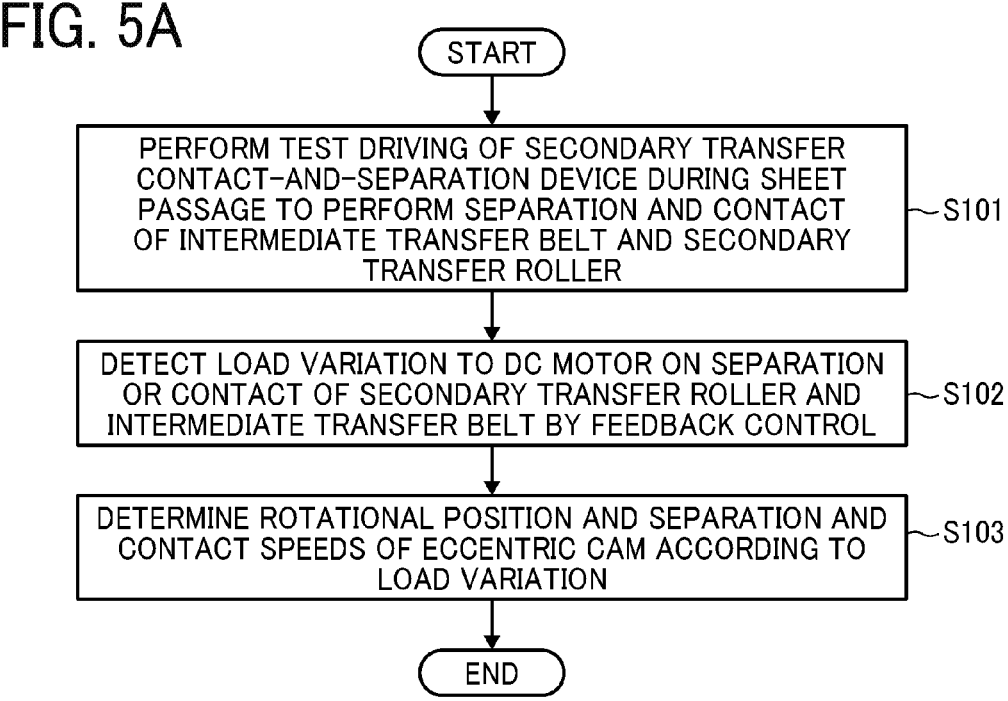
FIGS. 5A and 5B are charts of another example of operation processing in the secondary transfer contact-and-separation device when the DC motor is driven with the controller of the image forming apparatus of FIG. 1, more specifically.
Figure 5B:
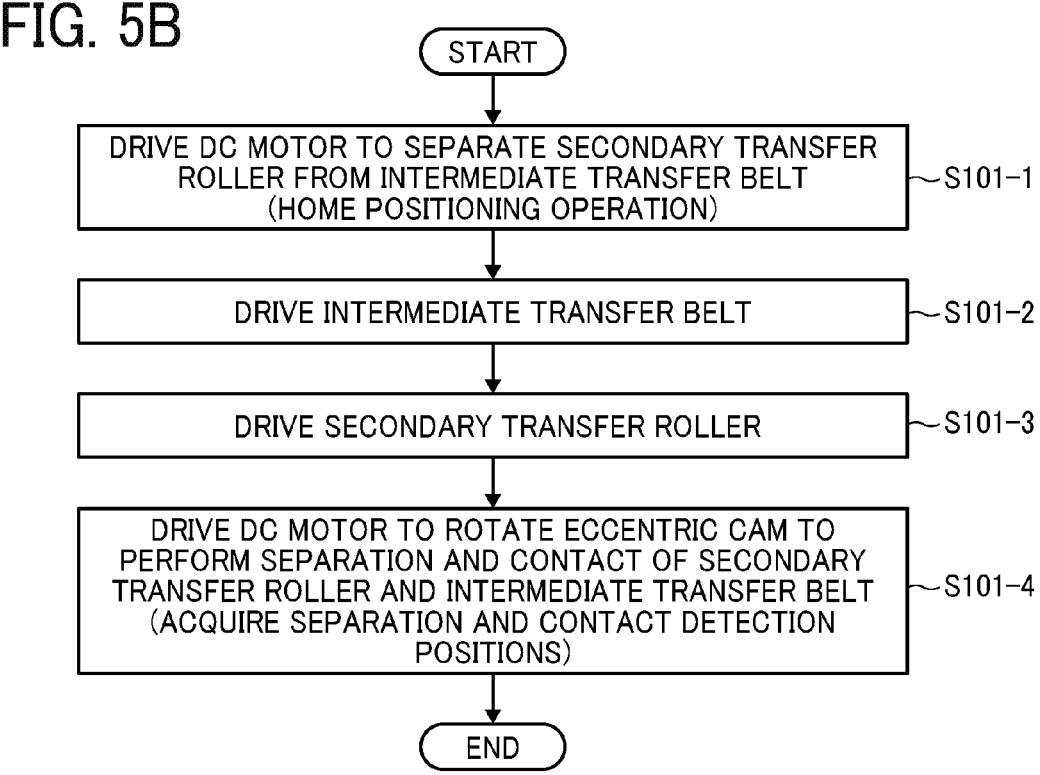

FIGS. 5A and 5B are charts of another example of operation processing in the secondary transfer contact-and-separation device 200 when the DC motor 3 is driven with the controller in the image forming apparatus 1000. FIG. 5A is a flowchart of another example of control processing of the secondary transfer contact-and-separation device 200 with the controller. FIG. 5B is a flowchart of details of test driving of the secondary transfer contact-and-separation device 200 at an initial stage of the control processing of FIG. 5A.

For the example of FIG. 5A, the control processing of the secondary transfer contact-and-separation device 200 is performed to cushion the impact on contact or separation of the intermediate transfer belt 7 and the secondary transfer roller 6. Therefore, during passage of a sheet, the secondary transfer contact-and-separation device 200 is preliminarily driven to separate and contact the intermediate transfer belt 7 and the secondary transfer roller 6 relative to each other (step S101). The controller detects a variation in load applied to the DC motor 3 on separation or contact of the secondary transfer roller 6 and the intermediate transfer belt 7 by feedback control (step S102). Note that examples of the load variation of a feedback value obtained from the feedback control include current value, speed error, positional error, pulse width modulation (PWM), and torque. The controller determines the rotation position (stop position), separation and the contact and separation speeds (velocities) of the eccentric cam 9 according to the load variation detected with the DC motor 3 (step S103). The physical quantity of the eccentric cam 9 contributes to a reduction of shock jitter.

With reference to FIG. 5B, in the test driving of the secondary transfer contact-and-separation device 200, when receiving a start signal, the controller drives the DC motor 3 and performs processing (home-positioning operation) to separate the secondary transfer roller 6 from the intermediate transfer belt 7 contacting the secondary transfer roller 6 (step S101-1). The controller performs processing of driving the intermediate transfer belt 7 (step S101-2) and processing of driving the secondary transfer roller 6 (step S101-3). The controller performs processing of driving the DC motor 3 to rotate the eccentric cam 9 to separate and contact the intermediate transfer belt 7 and the secondary transfer roller 6 relative to each other (acquire separation and contact detection positions) (step S101-4). As described above, the test driving of the secondary transfer contact-and-separation device 200 is performed, for example, at startup, on a return from a sleep mode, and before and after transfer.

Figure 6:
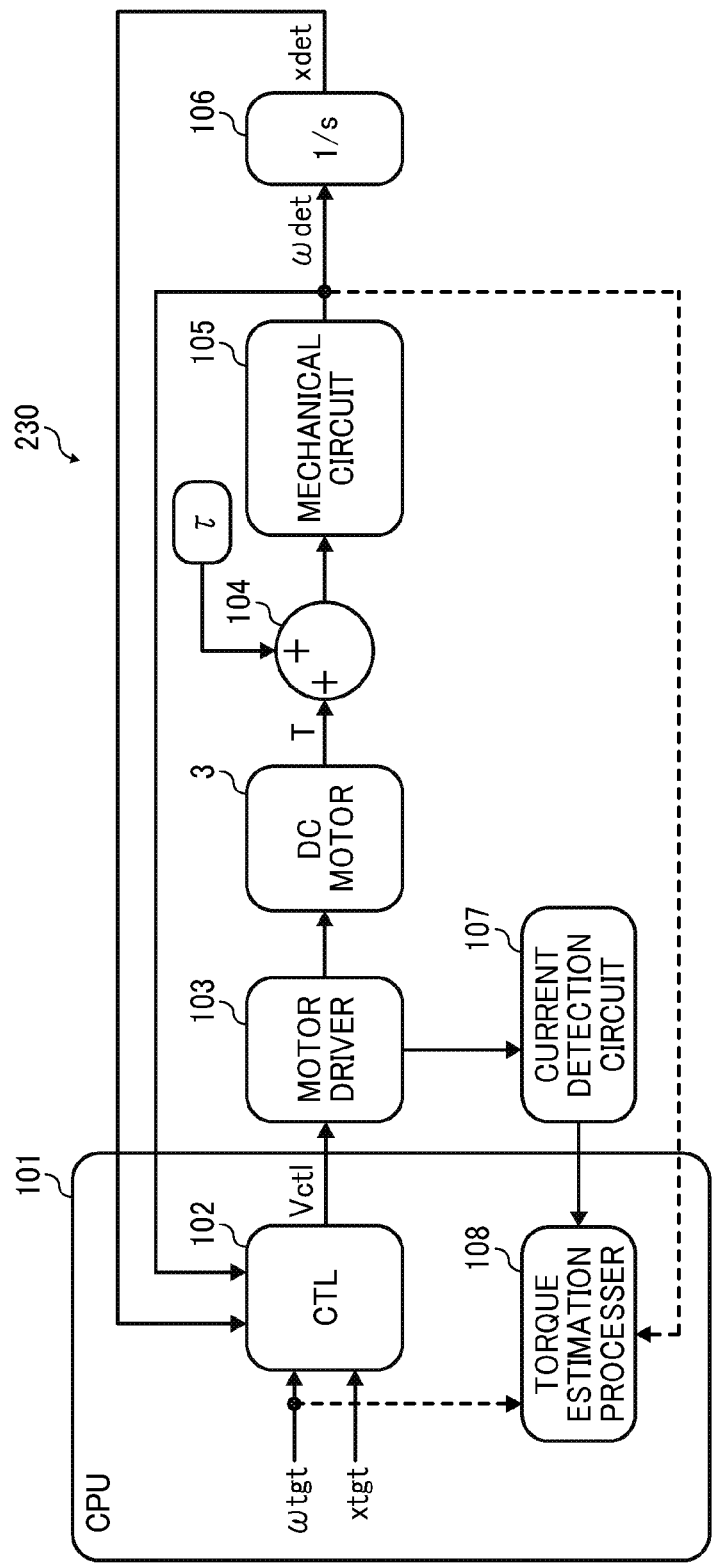
FIG. 6 is a diagram of an example of a DC motor control circuit to perform feedback control on the DC motor, which is included in the control processing of FIGS. 4A and 5A.

FIG. 6 is a diagram of an example of a DC motor control circuit to perform the feedback control on the DC motor 3, which is included in the control processing of FIGS. 4A and 5A.

With reference to FIG. 6, a DC motor control circuit 230 includes a voltage control unit (CTL) 102 and a CPU 101. The voltage control unit (CTL) 102 performs motor control processing. The CPU 101 is a central processing unit including a built-in torque estimation processor 108 to perform torque estimation processing. The DC motor control circuit 230 further includes a motor driver 103 and the DC motor 3. The motor driver 103 performs switching processing to drive the DC motor 3 in response to a control voltage Vctl from the voltage control unit (CTL) 102. The DC motor 3 is driven with the motor driver 103 to output a motor torque T. The DC motor control circuit 230 further includes an adder 104 $t$ and a mechanical circuit 105. The adder 104 adds the motor torque T from the DC motor 3 and a load torque τ from an external unit. The mechanical circuit 105 detects a motor rotation speed ωdet from an added value of the motor torque T and the load torque t and outputs the motor rotation speed ωdet. The DC motor control circuit 230 further includes an integral (1/s) circuit 106 to integrate the motor rotation speed ωdet (with 1/s) to output a motor position xdet. The DC motor control circuit 230 further includes a current detection circuit 107 to output, to the torque estimation processor 108, a current detection signal that represents a current detected based on an inter-shunt-resistance voltage signal in the motor driver 103.

The voltage control unit (CTL) 102 receives a target speed (ωtgt) and a target position (xtgt) input from an external unit, the motor rotation speed ωdet input from the mechanical circuit 105, and the motor position xdet input from the integral (1/s) circuit 106. Hence, voltage control unit (CTL) 102 performs computation for motor control according to the above-described information, and outputs, to the motor driver 103, a control voltage Vctl of the pulse width modulation (PWM) format. In the voltage control unit (CTL) 102, for example, speed feedback control, position feedback control, speed feedforward control, and position feedforward control. The motor driver 103 performs the above-described switching processing and can detect a synthesized current with the inter-shunt-resistance voltage. In the mechanical circuit 105, for example, a two-phase encoder is applicable as a measurement sensor. The torque estimation processor 108 receives, with an analog-to-digital converter (ADC), the current detection signal from the current detection circuit 107 to perform the torque estimation processing. At this time, the torque estimation processor 108 changes an estimation formula according to the motor rotation speed ωdet and uses the target speed Cot or the motor rotation speed ωdet as rotation speed data. The CPU 101 can be regarded as a control device that performs the function of the controller. The CPU 101 has a function of detecting the separation or contact of the intermediate transfer belt 7 performed by the secondary transfer contact-and-separation device 200, according to the load variation of the feedback value obtained from the feedback control. The configuration of the secondary transfer contact-and-separation device 200 combined with the CPU 101 as the control device may be referred to as a contact-and-separation system as described above. In other words, the image forming apparatus 1000 illustrated in FIG. 1 is configured to include a contact-and-separation system.

Figure 7A:
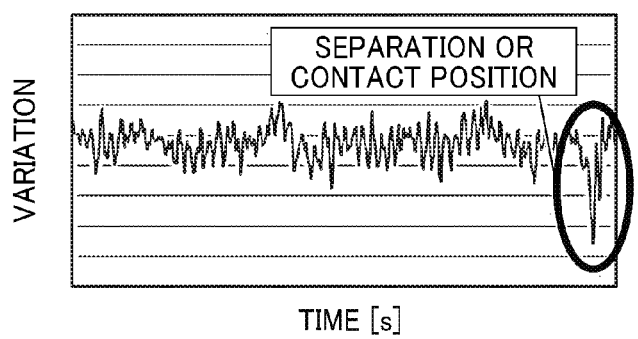
FIGS. 7A through 7C are diagrams of criteria of detecting a load variation of the DC motor with the feedback control, which is included in the control processing of FIGS. 4A and 5A, more specifically.
Figure 7B:
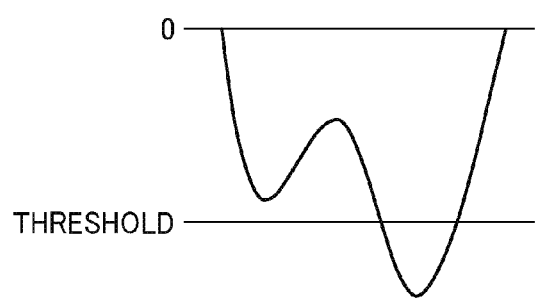
Figure 7C:
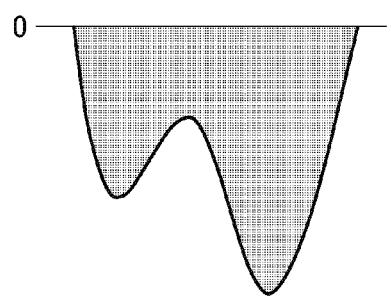

FIGS. 7A through 7C are diagrams of criteria of detecting the load variation of the DC motor 3 with the feedback control, which is included in the above-described control processing of FIGS. 4A and 5A. FIG. 7A is a characteristic diagram of a variation waveform of the DC motor 3 over time [s]. FIGS. 7B and 7C are graphs of threshold determination and area determination, respectively, at a specific range.

In FIG. 7A is illustrated a variation waveform obtained by the feedback control of the DC motor control circuit 230 illustrated in FIG. 6. A specific range of the variation waveform enclosed with a circle represents separation or contact timing of the intermediate transfer belt 7 and the secondary transfer roller 6, at which a great variation occurs. Such a variation is detected as the feedback value obtained from the feedback control with the CPU 101 of the DC motor control circuit 230 illustrated in FIG. 6, through a physical value(s), for example, current value, speed error, positional error, pulse width modulation (PWM), and torque.

As the criteria of detection of the load variation, in the threshold determination of FIG. 7B, an example is illustrated in which the CPU 101 determines that the separation or contact has been detected when the load variation of the physical value detected by the feedback control with the CPU 101 exceeds a preset threshold regardless of whether the physical value is positive or negative. In another example, for the area determination (in a specific range) of FIG. 7C, the CPU 101 determines that the separation or contact has been detected when the area of the load variation in a specific range of the physical value(s) detected by the feedback control exceeds a predetermined threshold. For example, when the average value of all data of the physical value(s) detected by the feedback control is assumed to be 0, the CPU 101 determines that the separation or contact has been detected when the area enclosed by the specific range, in which the load variation greatly occurs, and 0 exceeds the preset threshold.

Figure 8:
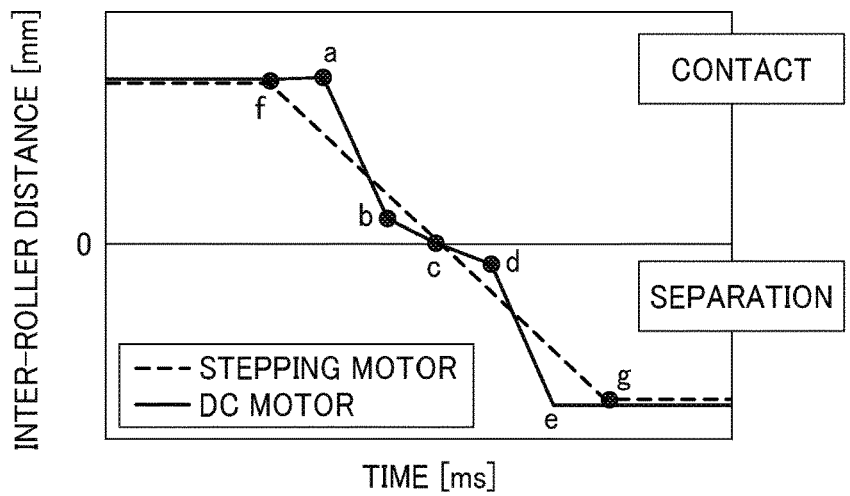
FIG. 8 is a graph of an example of control of determination, which is included in the control processing of FIG. 5A, of a rotation position of the eccentric cam according to the load variation and a separation speed of the secondary transfer roller from the intermediate transfer belt, illustrated in comparison with a case in which a comparative example of a stepping motor is used.

FIG. 8 is a graph of an example of control of determination of the rotation position of the eccentric cam 9 according to the load variation and the separation speed of the secondary transfer roller 6 from the intermediate transfer belt 7, illustrated in comparison with a case in which a comparative example of a stepping motor is used. The control of determination is included in the control processing of FIG. 5A. Specifically, FIG. 8 is a characteristic diagram illustrated with a relationship of the inter-roller distance [mm] between the intermediate transfer repulsion roller 5 and the secondary transfer roller 6 relative to time [ms].

With reference to FIG. 8, here, an example of control of separating operation is described as the control after the load variation is detected by the feedback control with the DC motor control circuit 230, which is described with reference to FIGS. 6 and 7A to 7C. When the control is performed with the comparative example of the stepping motor indicated by a broken line in FIG. 8, the intermediate transfer repulsion roller 5 and the secondary transfer roller 6 can be separated only at a constant speed from a start f of a separating operation in the contact state to an end g of the separating operation in the separation state. The constant speed corresponds to an inclination of a graph in a section from times f to g.

By contrast, when the DC motor 3 indicated by a solid line in FIG. 8 is used, a time c at which the secondary transfer roller 6 and the intermediate transfer belt 7 is separated by the secondary transfer contact-and-separation device 200 can be detected based on the load variation of the feedback value obtained from the above-described the feedback control. Hence, in the control of the CPU 101 of the DC motor control circuit 230, the time c determined as the time of separation by the CPU 101 is stored in a storage device, such as a memory. A focus is made on the speed in a time period within a predetermined time before and after the time c at which the secondary transfer contact-and-separation device 200 separates the secondary transfer roller 6 from the intermediate transfer belt 7. Note that the time period with the predetermined time corresponds to a section from time b to time d. The speed corresponds to an inclination of the graph in the section from time b to time d. As for the speed, the secondary transfer contact-and-separation device 200 is driven so that the speed is lower than a speed at which the contact pressure (nip pressure) of the intermediate transfer belt 7 and the secondary transfer roller 6 is reduced from the contact state in which the intermediate transfer belt 7 contacts the secondary transfer roller 6. Simultaneously, the secondary transfer contact-and-separation device 200 is driven so that the speed is lower than a speed at which a distance between the intermediate transfer belt 7 and the secondary transfer roller 6 is increased after separation of the intermediate transfer belt 7 and the secondary transfer roller 6. Note that the speed at which the contact pressure is reduced corresponds to an inclination in a section from time a to time b, and the speed at which the distance is increased corresponds to an inclination in a section from time d to time e. In other words, here, the DC motor control circuit 230 adjusts the rotation speed and the rotation angle of the DC motor 3 according to the load variation detected based on the feedback value obtained from the feedback control, to cushion an impact in the separating operation of the secondary transfer contact-and-separation device 200. Such a configuration can effectively reduce shock jitter.

Through the feedback control, the time at which the secondary transfer contact-and-separation device 200 contacts the secondary transfer roller 6 with the intermediate transfer belt 7 can be detected based on the load variation of the feedback value. Hence, in the control performed by the CPU 101 of the DC motor control circuit 230, the time determined as the time of contact is similarly stored in the storage device. A focus is made on the speed in a time period within a predetermined time before and after the time at which the secondary transfer contact-and-separation device 200 contacts the secondary transfer roller 6 with the intermediate transfer belt 7. As for the speed, the secondary transfer contact-and-separation device 200 is driven so that the speed is lower than a speed at which the intermediate transfer belt 7 moves toward the secondary transfer roller 6 from the separation state in which the intermediate transfer belt 7 is separated from the secondary transfer roller 6.

Simultaneously, the secondary transfer contact-and-separation device 200 is driven so that the speed is lower than a speed at which the intermediate transfer belt 7 is pressed against the secondary transfer roller 6 to reach a predetermined contact pressure (nip pressure) after contact of the intermediate transfer belt 7 and the secondary transfer roller 6. In other words, here, the DC motor control circuit 230 adjusts the rotation speed and the rotation angle of the DC motor 3 according to the load variation detected based on the feedback value obtained from the feedback control, to cushion an impact due to contacting operation of the secondary transfer contact-and-separation device 200. Such a configuration can effectively reduce shock jitter.

Figure 9:
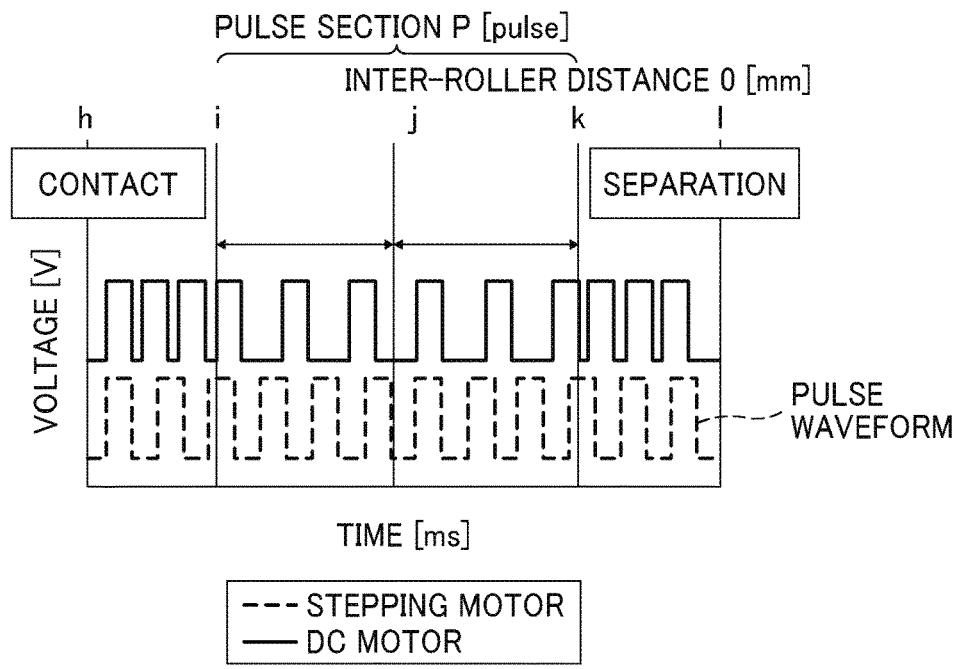
FIG. 9 is a graph of an example of control of determination, which is included in the control processing of FIG. 5A, of a rotation position of the eccentric cam according to the load variation and a separation speed of the secondary transfer roller from the intermediate transfer belt, illustrated in comparison with a case in which a comparative example of a stepping motor is used.

FIG. 9 is a graph of another example of control of determination of the rotation position of the eccentric cam 9 according to the load variation and the separation speed of the secondary transfer roller 6 from the intermediate transfer belt 7, illustrated in comparison with a case in which a comparative example of a stepping motor is used. The control of determination is included in the control processing of FIG. 5A. Specifically, FIG. 9 is a characteristic diagram illustrated with a relationship of voltage [C] relative to time [ms].

With reference to FIG. 9, here, an example of control of separating operation is also described as the control after the load variation is detected by the feedback control with the DC motor control circuit 230, which is described with reference to FIGS. 6 and 7A to 7C. When the control is performed with the comparative example of the stepping motor indicated by a broken line in FIG. 9, pulse can be applied only at a constant interval from a start h of a separating operation in the contact state to an end i of the separating operation in the separation state. The constant interval correspond to a pulse waveform in a section from time h to time i.

By contrast, when the DC motor 3 indicated by a solid line in FIG. 9 is used, a time j at which the secondary transfer contact-and-separation device 200 separates the secondary transfer roller 6 from the intermediate transfer belt 7 can be detected based on the load variation of the feedback value obtained from the above-described the feedback control. Here, the time j indicates that the inter-roller distance between the intermediate transfer repulsion roller 5 and the secondary transfer roller 6 is 0 mm. Hence, in the control of the CPU 101 of the DC motor control circuit 230, the time j detected as the time of separation by the CPU 101 is stored in a storage device, such as a memory. A focus is made on a pulse interval in a pulse section P within a predetermined number of pulses (in this example, three pulses) before and after the time j at which the secondary transfer the contact-and-separation device 200. Here, the pulse interval correspond to a pulse waveform in a section from time i to time k. As for the pulse interval, the secondary transfer contact-and-separation device 200 is driven so that the pulse interval is greater than a pulse interval in which the contact pressure (nip pressure) of the intermediate transfer belt 7 and the secondary transfer roller 6 is reduced from the contact state in which the intermediate transfer belt 7 contacts the secondary transfer roller 6. Simultaneously, the secondary transfer contact-and-separation device 200 is driven so that the pulse interval is greater than a pulse interval at which the distance between the intermediate transfer belt 7 and the secondary transfer roller 6 is increased after separation of the intermediate transfer belt 7 from the secondary transfer roller 6. The pulse interval in which the contact pressure is reduced corresponds to a pulse waveform in a section from time h to time i, and the pulse interval in which the distance is increased corresponds to an inclination in a section from time k to time 1. In other words, here, the DC motor control circuit 230 also adjusts the rotation speed and the rotation angle of the DC motor 3 according to the load variation detected based on the feedback value obtained from the feedback control, to cushion an impact in the separating operation of the secondary transfer contact-and-separation device 200. Such a configuration can effectively reduce shock jitter.

Through the feedback control, the time at which the secondary transfer contact-and-separation device 200 contacts the secondary transfer roller 6 with the intermediate transfer belt 7 can be detected based on the load variation of the feedback value. Hence, in the control performed by the CPU 101 of the DC motor control circuit 230, the time determined as the time of contact is similarly stored in the storage device. A focus is made on the pulse interval in a pulse section within a predetermined number of pulses before and after the time at which the secondary transfer contact-and-separation device 200 contacts the secondary transfer roller 6 with the intermediate transfer belt 7. As for the pulse interval, the secondary transfer contact-and-separation device 200 is driven so that the pulse interval is greater than a pulse interval in which the intermediate transfer belt 7 approaches the secondary transfer roller 6 from the separation state in which the intermediate transfer belt 7 is separated from the secondary transfer roller 6. Simultaneously, the secondary transfer contact-and-separation device 200 is driven so that the pulse interval is greater than a pulse interval in which the intermediate transfer belt 7 is pressed against the secondary transfer roller 6 to reach a predetermined contact pressure after contact of the intermediate transfer belt 7 and the secondary transfer roller 6. In other words, here, the DC motor control circuit 230 also adjusts the rotation speed and the rotation angle of the DC motor 3 according to the load variation detected based on the feedback value obtained from the feedback control, to cushion an impact due to contacting operation of the secondary transfer contact-and-separation device 200. Such a configuration can effectively reduce shock jitter.

Through the two control operations described above with reference to FIGS. 8 and 9, the speed on separation or contact of the secondary transfer roller 6 and the intermediate transfer belt 7 can be lowered than the speed in the control performed by the comparative example of the stepping motor. Accordingly, the impact can be reduced, thus reducing shock jitter. In addition, the separating operation time and the contact operation time can be reduced.

Figure 10:
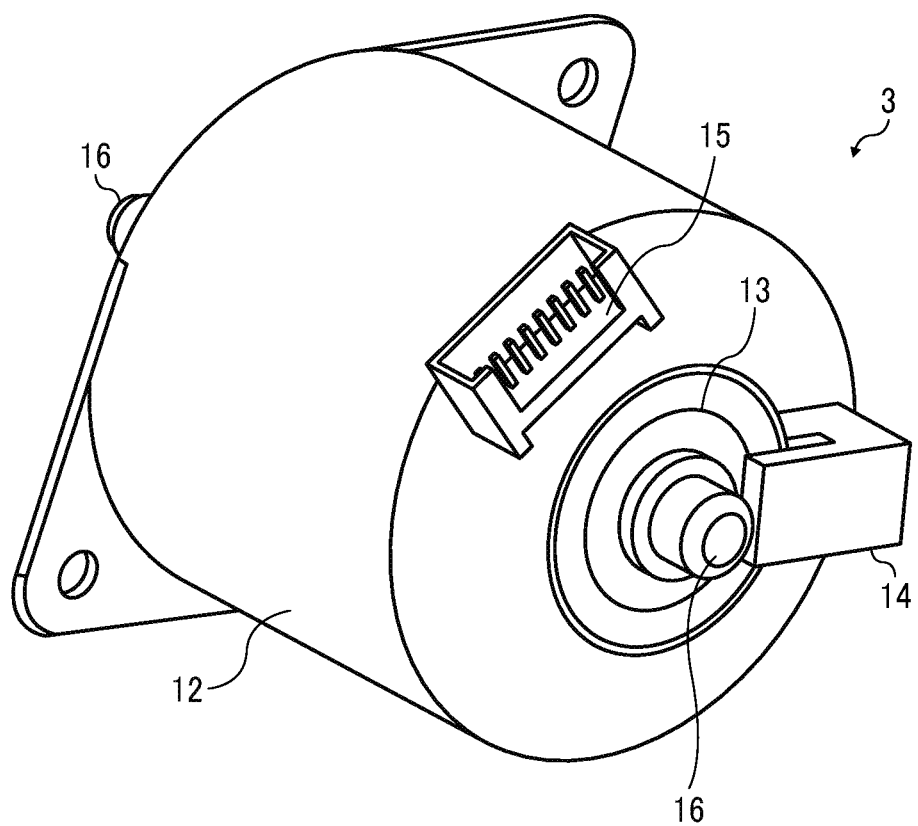
FIG. 10 is a perspective view of an outer configuration of the DC motor of the secondary transfer contact-and-separation device of FIGS. 2A through 2D.

FIG. 10 is a perspective view of an outer configuration of the DC motor 3 of the secondary transfer contact-and-separation device 200.

With reference to FIG. 10, the DC motor 3 is a brushless type. An encoder disc 13 is coaxially mounted around a motor rotation shaft 16 of a motor body 12. A photosensor 14 is mounted on the motor body 12 near the encoder disc 13. A driver circuit and a connector 15 are mounted on a board on the motor body 12 to input and output a motor signal and an encoder signal.

Figure 11:
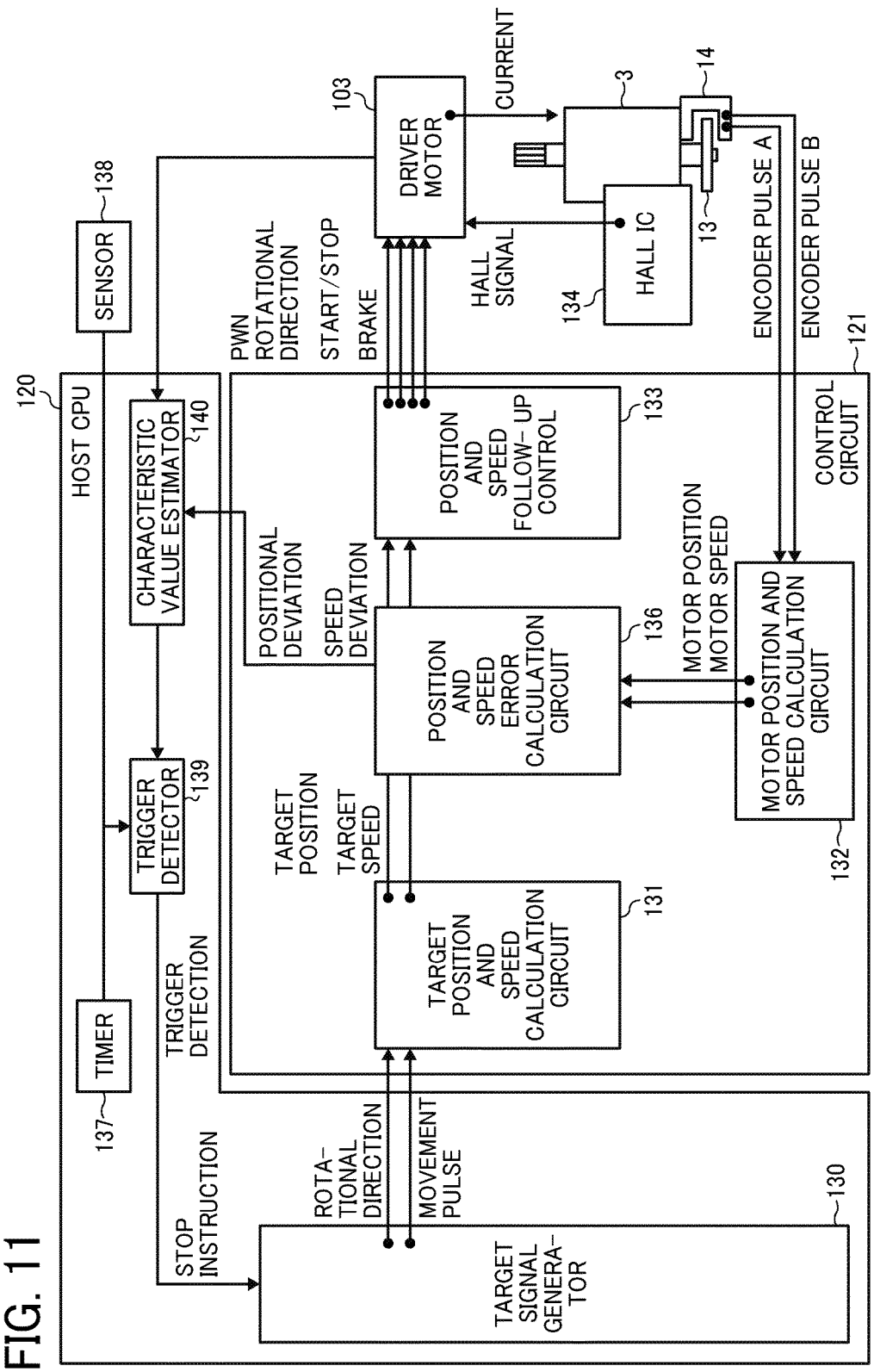
FIG. 11 is a functional block diagram of configurations of a driving device and a load variation estimation device for the DC motor of FIG. 10.

FIG. 11 is a functional block diagram of configurations of a driving device and a load variation estimation device for the DC motor 3.

With reference to FIG. 11, the driving device and the load variation estimation device are functional configurations of the above-described CPU 101 that are constructed in conjunction with functions of a host CPU 120 and a control circuit 121 and functions of the motor driver 103.

For example, a target signal generator 130 in the host CPU 120 transmits signals relating to the rotary direction and the number of shift pulses to a target position and speed calculation circuit 131 in the control circuit 121. The target position and speed calculation circuit 131 derives a target position and a target speed from data obtained from the signals and time data of an oscillator, and transmits the target position and the target speed to a position and speed error calculation circuit 136. A motor position and speed calculation circuit 132 in the control circuit 121 measures an encoder pulse A and an encoder pulse B output from the photosensor 14 having two channels. The photosensor 14 is disposed at the encoder disc 13 mounted on the DC motor 3. The photosensor 14 having two channels includes two sets of light-emitting elements and light-receiving elements, which are disposed so that the phase difference between pulse signals is a predetermined amount. With such a configuration, the motor position and speed calculation circuit 132 can detect the rotary direction from the phase difference and derive the motor position and the motor speed from the obtained data and the time data of the oscillator.

The position and speed error calculation circuit 136 determines a positional deviation and a speed deviation, based on the signals indicating the target position and the target speed from the target position and speed calculation circuit 131 and the signals indicating the motor position and the motor speed from the motor position and speed calculation circuit 132. The position and speed error calculation circuit 136 transmits the positional deviation and the speed deviation to a position and speed follow-up control 133. The position and speed follow-up control 133 performs control to follow up the motor position and the motor speed so that the motor position matches the target position and the motor speed matches the target speed. The position and speed follow-up control 133 transmits, to the motor driver 103, various signals relating to, for example, pulse width modulation (PWM), rotary direction, start and stop, and brake, as needed. The motor driver 103 controls the motor current and the pulse width modulation (PWM) voltage to be supplied to the DC motor 3, based on various signals obtained from the position and speed follow-up control 133 and a hall signal from a hall integrated circuit (IC) 134 of the DC motor 3. The detection of the load variation on contact or separation of the secondary transfer roller 6 and the intermediate transfer belt 7 is determined based on, for example, various errors calculated in the position and speed error calculation circuit 136 or the pulse width modulation (PWM) input to the motor driver 103. In the host CPU 120, a trigger detector 139 detects a trigger from a signal of a timer 137 or a sensor 138 as an external input, and sends a stop command to the target signal generator 130. In addition, a characteristic value estimator 140 estimates a characteristic value and sends the characteristic value to the trigger detector 139. The trigger detector 139 determines detection of the trigger, based on the characteristic value.

For the control of the secondary transfer contact-and-separation device 200 with the comparative example of the stepping motor, the rotation speed cannot be changed on contact or separation of rollers, such as the intermediate transfer repulsion roller 5, and the secondary transfer roller 6. Accordingly, a greater load variation indicating the impact on the contact or separation, thus hampering sufficient reduction of shock jitter. However, the secondary transfer contact-and-separation device 200 according to the first embodiment can reduce such shock jitter. In other words, the load variation indicating an impact on separation or contact of the secondary transfer roller 6 and the intermediate transfer belt 7 is detected based on the feedback value of the feedback control which the DC motor control circuit 230 performs on the secondary transfer contact-and-separation device 200 employing the DC motor 3. The rotation position of the eccentric cam 9 in the secondary transfer contact-and-separation device 200 and the contact and separation speeds of the secondary transfer roller 6 and the intermediate transfer belt 7 are properly changed by adjusting the rotation speed and the rotation angle of the DC motor 3 according to the detected load variation. With such a configuration, an impact on separation or contact of the secondary transfer roller 6 and the intermediate transfer belt 7 is cushioned, thus reducing shock jitter. Accordingly, a sensor to detect the load variation can be obviated, thus allowing detection of the load variation on contact and separation of the secondary transfer roller 6 and the intermediate transfer belt 7 at low cost. In addition, the feedback control can be executed and the contact and separation speeds of rollers, such as the intermediate transfer repulsion roller 5 and the secondary transfer roller 6, can be optimized, thus allowing sufficient reduction of shock jitter.

In other words, one technical point of the secondary transfer contact-and-separation device 200 according to the first embodiment is a contact-and-separation method relating to the contact-and-separation system that includes the contact-and-separation device 200 to contact or separate the intermediate transfer belt 7 relative to the secondary transfer roller 6, which is disposed opposite the intermediate transfer repulsion roller 5 contacting the intermediate transfer belt 7 via the sheet 8 conveyed. In the present embodiment, the contact-and-separation method includes a contact-and-separation step and a deceleration step. In the contact-and-separation step, the intermediate transfer belt 7 is contacted to or separated from the secondary transfer roller 6 via the sheet 8 conveyed, by the rotation of the eccentric cam 9. The eccentric cam 9 is mounted on an end of the rotation shaft 11 of the intermediate transfer repulsion roller 5 and rotated by power of the DC motor 3 controlled with the controller. In the deceleration step, the CPU 101 decelerates the rotation speed of the DC motor 3 on separation or contact of the intermediate transfer belt 7 between the intermediate transfer repulsion roller 5 and the secondary transfer roller 6 that are disposed opposite each other. Thus, shock jitter can be reduced.

The secondary transfer contact-and-separation device 200 according to the first embodiment has a function of detecting the load variation on contact of the intermediate transfer repulsion roller 5 and the secondary transfer roller 6 or contact of the secondary transfer roller 6 and the intermediate transfer belt 7 without installation of a sensor to detect the load variation, to determine the stop position of the eccentric cam 9. The stop position of the eccentric cam 9 is referred to as home position (HP). For such a function, temporal variations may occur in occurrence of the load variation due to contact or separation of the intermediate transfer repulsion roller 5 and the secondary transfer roller 6 or contact or separation of the secondary transfer roller 6 and the intermediate transfer belt 7. Accordingly, the home position might not always be fixed at one point.

Figure 12:
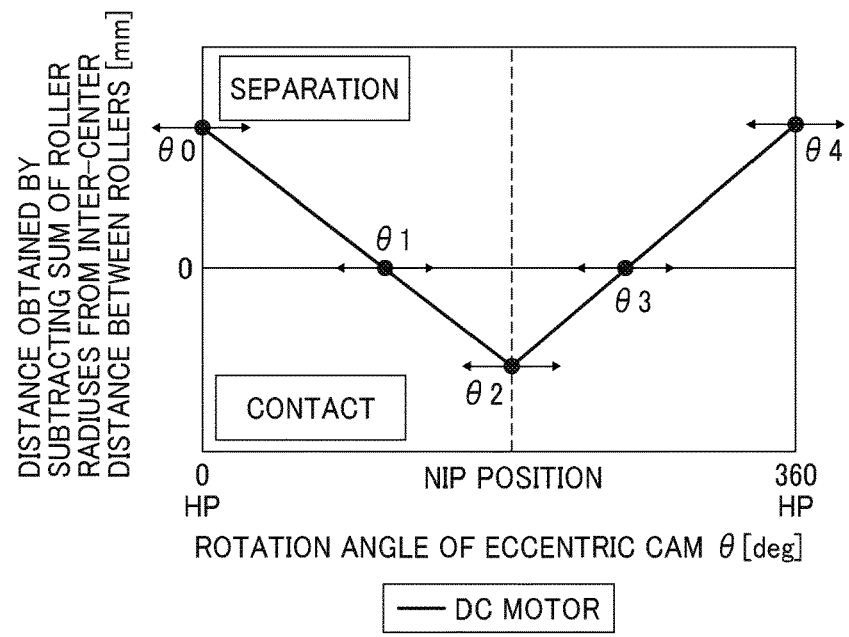
FIG. 12 is a graph of a relationship of the distance obtained by subtracting a sum of radiuses of rollers from an inter-center distance between the rollers, relative to a rotation angle of the eccentric cam under the control of the secondary transfer contact-and-separation device with the DC motor of FIG. 10.

FIG. 12 is a graph of a relationship of the distance [mm] obtained by subtracting a sum of radiuses of rollers from an inter-center distance between the rollers, relative to the rotation angle θ [degrees] of the eccentric cam 9 under the above-described control of the secondary transfer contact-and-separation device 200 with the DC motor 3. Note that the rollers in this example are the intermediate transfer repulsion roller 5 and the secondary transfer roller 6.

The example of FIG. 12 assumes a state in which, when the secondary transfer contact-and-separation device 200 according to the first embodiment is driven with the DC motor 3, the eccentric cam 9 is made one rotation from the home position (HP) at which the rotation angle θ0 of the eccentric cam 9 on activation of the DC motor 3 in initial separation is 0. In such a case, on contact and separation of the intermediate transfer repulsion roller 5 and the secondary transfer roller 6 or contact and separation of the secondary transfer roller 6 and the intermediate transfer belt 7, the load variation is detected at the rotation angles θ1 and θ3 of the eccentric cam 9 and stored in the storage device to determine the home position. Note that the rotation angle θ1 of the eccentric cam 9 is an angle on a transition from separation to contact and the rotation angle θ3 of the eccentric cam 9 is an angle on a transition from contact to separation. The rotation angle θ2 of the eccentric cam 9 corresponds to an angle at the contact (nip) position. The rotation angle θ4 of the eccentric cam 9 corresponds to an angle (of 360 degrees) at the home position (HP) after just one rotation. In such a method, however, variations of ranges as indicated by arrows in FIG. 12 might occur in each of the rotation angles θ0, θ1, θ3, and θ4 of the eccentric cam 9 on contact and separation of the intermediate transfer repulsion roller 5 and the secondary transfer roller 6 or contact and separation of the secondary transfer roller 6 and the intermediate transfer belt 7, thus hampering the home position (HP) from being fixed at one point. Similarly, the contact (nip) position might also vary. Hence, according to the secondary transfer contact-and-separation device 200 described below, the home position (HP) can be fixed at one point and the contact position can also be fixed.

Second Embodiment

Figure 13A:
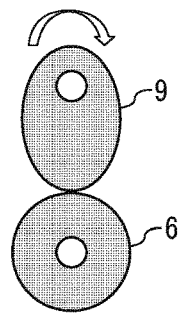
FIGS. 13A through 13D are partial views of the secondary transfer contact-and-separation device according to a second embodiment of the present disclosure, illustrated in comparison with the secondary transfer contact-and-separation device according to the first embodiment, more specifically.
Figure 13B:
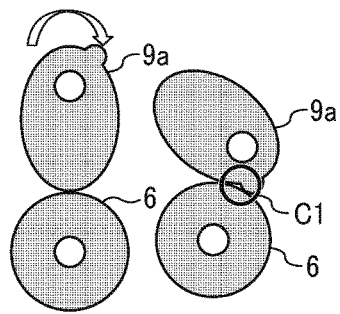
Figure 13C:
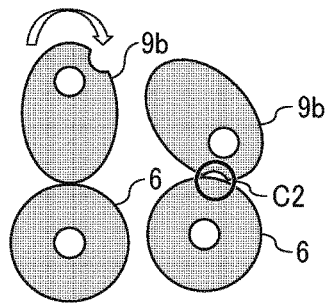
Figure 13D:
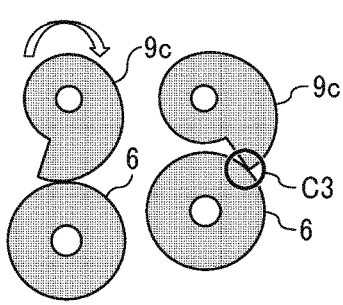

FIGS. 13A through 13D are partial views of the secondary transfer contact-and-separation device 200 according to the second embodiment of the present disclosure, illustrated in comparison with the secondary transfer contact-and-separation device 200 according to the first embodiment. FIG. 13A is an illustration of a home position of the eccentric cam 9 and the secondary transfer roller 6 during separation in the first embodiment. FIG. 13B is an illustration of a home position of an eccentric cam 9a according to one example of the second embodiment and the secondary transfer roller 6 during separation and a load variation detection position on determination of the home position. FIG. 13C is an illustration of a home position of an eccentric cam 9b according to another example of the second embodiment and the secondary transfer roller 6 during separation and a load variation detection position on determination of the home position. FIG. 13D is an illustration of a home position of an eccentric cam 9c according to still another example of the second embodiment and the secondary transfer roller 6 during separation and a load variation detection position on determination of the home position.

With reference to FIGS. 13B, 13C, and 13D, each of the eccentric cams 9a, 9b, and 9c has a deformed portion of, e.g., a convex or concave shape unlike the eccentric cam 9 of FIG. 13A. The shape of each of the eccentric cams 9a, 9b, and 9c according to the second embodiment is formed so that a load variation on hitting of the deformed portion of the cam to the secondary transfer roller 6 is greater than a load variation on contact and separation of the intermediate transfer belt 7 between the intermediate transfer repulsion roller 5 and the secondary transfer roller 6, which are disposed opposite each other. Hence, the driving device and the load variation estimation device illustrated in FIG. 11 determine the stop position of the eccentric cam 9a, 9b, or 9c, based on the greater load variation. Such a configuration can fix the home position at one point without influence of deviation of the load variation. Note that the eccentric cam 9 illustrated in FIG. 13A rotates in a direction indicated by arrow and has a smooth shape so as to prevent a great speed variation from occurring on one rotation. In such a case, as described in the first embodiment, the load variation is detected on contact and separation of the intermediate transfer repulsion roller 5 and the secondary transfer roller 6 or contact and separation of the secondary transfer roller 6 and the intermediate transfer belt 7, to determine the home position.

For example, the eccentric cam 9a illustrated in FIG. 13B has the deformed portion of a convex shape. The eccentric cam 9a detects the load variation to determine the home position, when the deformed portion approaches an area enclosed with circle C1 in FIG. 13B in one rotation. The speed variation or the positional error at this time becomes greater toward the minus side relative to the rotation speed target value. The eccentric cam 9b illustrated in FIG. 13C has the deformed portion of a concave shape. The eccentric cam 9b detects the load variation to determine the home position, when the deformed portion approaches an area enclosed with circle C2 in FIG. 13C in one rotation. The speed variation or the positional error at this time becomes greater toward the plus side relative to the rotation speed target value. The eccentric cam 9c illustrated in FIG. 13D has the deformed portion of a flange shape that is deformed to be partially greater in thickness. The eccentric cam 9c is used so as to rotate a little less than one rotation in the transition from separation to contact. The eccentric cam 9c detects the load variation to determine the home position, when the deformed portion approaches an area enclosed with circle C3 in FIG. 13D in one rotation. When the eccentric cam 9c continues rotating, the deformed portion of the flange shape contacts the secondary transfer roller 6. Accordingly, the speed and the positional error become zero and the eccentric cam 9c stops. Details are described later. Note that the CPU 101 decelerates the rotation speed of the DC motor 3 at a timing based on the load variation.

Figure 14:
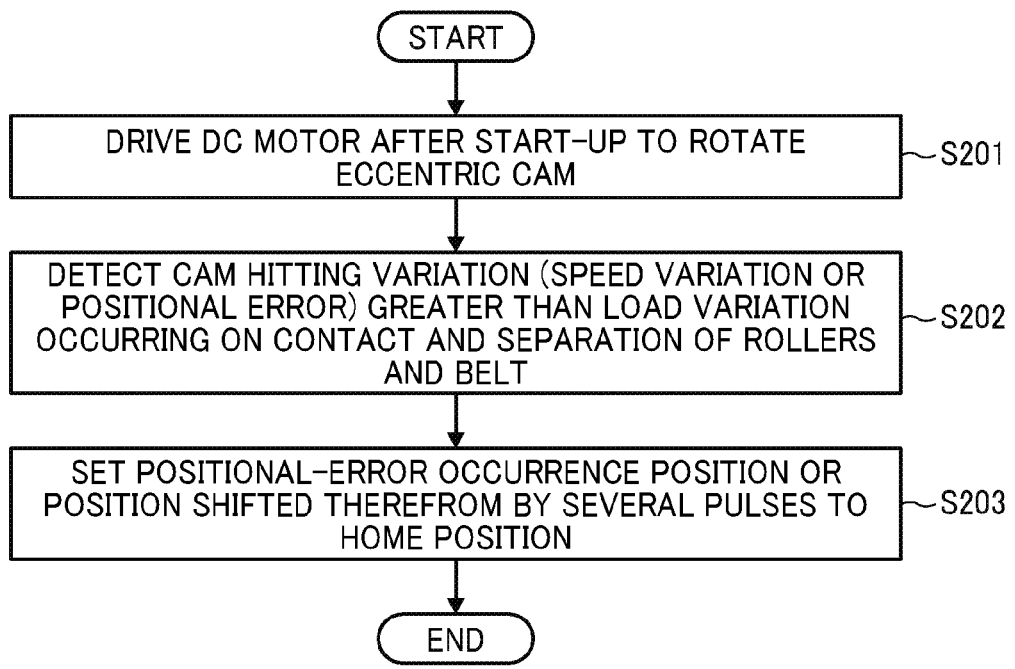
FIG. 14 is a flowchart of control processing of the secondary transfer contact-and-separation device according to the second embodiment, driven by the DC motor with the controller of the image forming apparatus of FIG. 1.

FIG. 14 is a flowchart of control processing of the secondary transfer contact-and-separation device 200 according to the second embodiment, performed by driving the DC motor 3. Note that the control processing relates to the determination of the home position by the driving with the DC motor 3, which is common to a case in which any of the eccentric cam 9a of FIG. 13B, the eccentric cam 9b of FIG. 13C, and the eccentric cam 9c of FIG. 13D is applied.

With reference to FIG. 14, in the control processing, the DC motor 3 is driven after the start-up of the image forming apparatus 1000, to rotate the eccentric cam 9a, 9b, or 9c (step S201). The rotary direction of the eccentric cam 9a, 9b, or 9c may be any of the forward rotation operation and the reverse rotation operation. Next, at step S202, the driving device and the load variation estimation device illustrated in FIG. 11 detect a cam hitting variation (speed variation or positional error) greater than a load variation occurring on contact and separation of the rollers (the intermediate transfer repulsion roller 5 and the secondary transfer roller 6) and the belt (the intermediate transfer belt 7). Here, the rollers (the intermediate transfer repulsion roller 5 and the secondary transfer roller 6) perform the contact and separating operation with rotation of the eccentric cam 9a, 9b, or 9c. The load variation occurs on the contact and separation. The control processing is set so that the magnitude of the load variation on the contact and separation does not contribute to the determination of the home position. The driving device and the load variation estimation device illustrated in FIG. 11 detect a variation exceeding a threshold range when the eccentric cam 9a, 9b, or 9c arrives at a point at which a load variation equal to or greater than the load variation on contact or separation of the rollers (the intermediate transfer repulsion roller 5 and the secondary transfer roller 6) during rotation. The threshold range is set in a range of values higher than a maximum peak value of the load variation on contact or separation of the rollers (the intermediate transfer repulsion roller 5 and the secondary transfer roller 6). In other words, the detection of the cam hitting variation includes not only the determination of hitting by detecting a greater speed variation than the load variation occurring on the contact or separation but also the subsequently performed detection of the positional error. When the positional error is detected, the occurrence position of the positional error or the position shifted from the occurrence position by several pulses is set to the home position (step S203). Thus, the secondary transfer contact-and-separation device 200 is preliminarily driven to determine the home position, on, for example, the start-up, return from the sleep mode, automatic rebooting, before and after image transfer, and turn-on/off of the front cover of the image forming apparatus 1000.

Figure 15A:
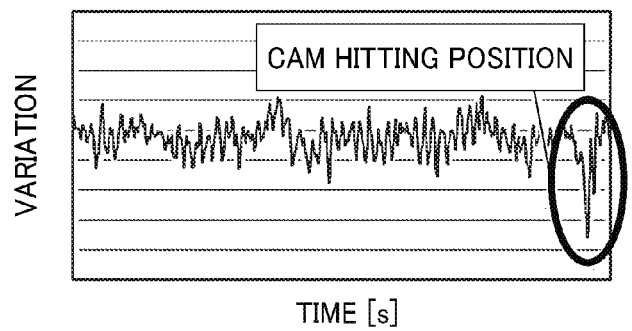
FIGS. 15A through 15C are diagrams of criteria of detecting the load variation relating to the DC motor and the cam hitting variation with the feedback control when the eccentric cam illustrated in FIG. 13B is employed, more specifically.
Figure 15B:
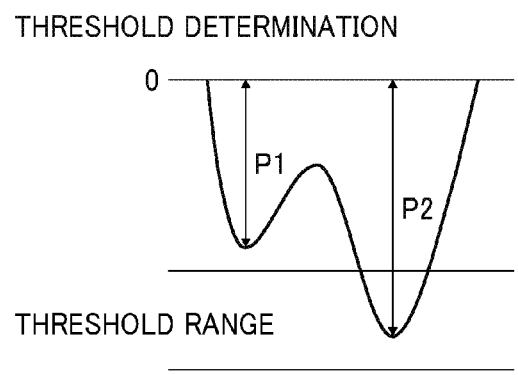
Figure 15C:
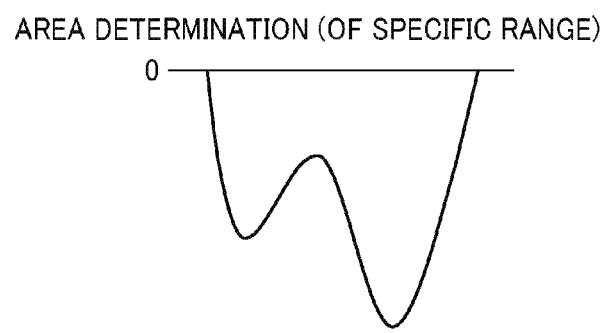

FIGS. 15A through 15C are diagrams of criteria of detecting the load variation relating to the DC motor 3 and the cam hitting variation with the feedback control when the eccentric cam 9a illustrated in FIG. 13B is employed. FIG. 15A is a characteristic diagram of a variation waveform of the DC motor 3 over time [s]. FIGS. 15B and 15C are graphs of threshold determination and area determination, respectively, at a specific range.

In FIG. 15A is illustrated a variation waveform obtained when the secondary transfer contact-and-separation device 200 is driven with the DC motor 3 according to the control processing described with reference to FIG. 14. An area enclosed by an oval in FIG. 9 corresponds to the cam hitting position at which the eccentric cam 9a rotates and a convex step of the deformed portion hits the secondary transfer roller 6. From FIG. 15A, it is found that a great variation occurs in the area. The driving device and the load variation estimation device illustrated in FIG. 11 detect the great variation through various values, e.g., a current value, speed error, positional error, pulse width modulation (PWM), and torque. Temporal deviations arise in the occurrence of the load variation on contact or separation of the rollers (the intermediate transfer repulsion roller 5 and the secondary transfer roller 6). By contrast, the occurrence of the great variation is fixed at one point. Accordingly, the home position can be accurately determined. Since the convex step of the deformed portion of the eccentric cam 9a hits the secondary transfer roller 6, the load variation turns to be on the minus side relative to the target speed and the target position.

As the criteria of detection of the cam hitting variation, in the threshold determination of FIG. 15B, an example is illustrated in which each value detected through the feedback control of the DC motor 3 falls in the threshold range set on the minus side relative to the target speed and the target position. For example, when each value falls in the threshold range, the driving device and the load variation estimation device illustrated in FIG. 11 determine that the step of the deformed portion of the eccentric cam 9a has hit the secondary transfer roller 6. The threshold range is set in a range of values greater toward the minus side than a waveform peak value P1 of the load variation on contact or separation of the rollers (the intermediate transfer repulsion roller 5 and the secondary transfer roller 6). A waveform peak value P2 of the cam hitting variation is further greater toward the minus side than the waveform peak value P1 and falls in the threshold range. Accordingly, the home position can be accurately determined.

In another example, for the area determination (in a specific range) of FIG. 15C, the driving device and the load variation estimation device illustrated in FIG. 11 determine that the step of the deformed portion of the eccentric cam 9a has hit the secondary transfer roller 6, when the area of the load variation of each value, which is detected through the feedback control, in the specific range exceeds a predetermined threshold. Note that the predetermined threshold is also set to a value greater than a variation component on contact or separation of the rollers (the intermediate transfer repulsion roller 5 and the secondary transfer roller 6). For example, in a case in which the average value of all data of the values detected through the feedback control is assumed to be 0, the driving device and the load variation estimation device illustrated in FIG. 11 determine that the convex step of the deformed portion of the eccentric cam 9a has hit the secondary transfer roller 6, when the area enclosed by a specific range including a large load variation and 0 exceeds the predetermined threshold. After the determination of hitting by the detection of speed variation, the detection of the positional error is performed. When the positional error is detected, the occurrence position of the positional error or a position shifted from the occurrence position by several pulses can be determined as the home position. Thus, since the occurrence position of the load variation on the hitting of the cam can be constantly fixed at one point, the detection of the load variation on the hitting of the cam can be more accurately performed than the detection of the load variation on contact and separation of the rollers (the intermediate transfer repulsion roller 5 and the secondary transfer roller 6).

Figure 16A:
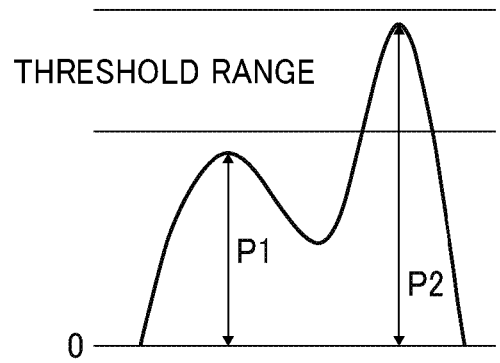
FIGS. 16A and 16B are diagrams of criteria (of threshold determination and area determination) of detecting the cam hitting variation relating to the DC motor with the feedback control when the eccentric cam illustrated in FIG. 13C is employed.
Figure 16B:
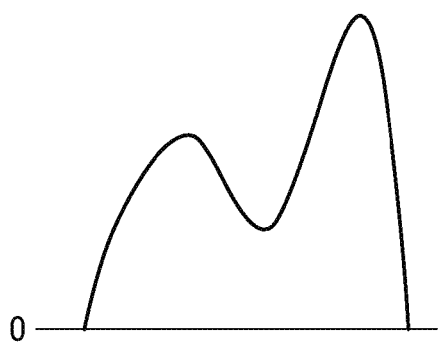

FIGS. 16A and 16B are diagrams of criteria (of threshold determination and area determination) of detecting the cam hitting variation relating to the DC motor 3 with the feedback control when the eccentric cam 9b illustrated in FIG. 13C is employed.

In contrast with the case of FIG. 15A, the example of FIGS. 16A and 16B, although the characteristic diagram of the variation waveform of the DC motor 3 relative to time is omitted here, corresponds to a case in which the load variation changes toward the plus side relative to the target speed and the target position. Similarly with the case of FIG. 15A, when the eccentric cam 9b rotates, the deformed portion hits the secondary transfer roller 6 and a large variation occurs on the plus side when a concave point of the deformed portion hits the secondary transfer roller 6. The driving device and the load variation estimation device illustrated in FIG. 11 detect the great variation through various values, e.g., a current value, speed error, positional error, pulse width modulation (PWM), and torque. Temporal deviations arise in the occurrence of the load variation on contact or separation of the rollers (the intermediate transfer repulsion roller 5 and the secondary transfer roller 6). By contrast, the occurrence of the great variation is fixed at one point. Accordingly, the home position can be accurately determined.

As the criteria of detection of the cam hitting variation, in the threshold determination of FIG. 16A, an example is illustrated in which each value detected through the feedback control of the DC motor 3 falls in the threshold range set on the plus side relative to the target speed and the target position. For example, when each value falls in the threshold range, the driving device and the load variation estimation device illustrated in FIG. 11 determine that the deformed portion of the eccentric cam 9b has hit the secondary transfer roller 6 and the concave point of the deformed portion has hit the secondary transfer roller 6. The threshold range is set in a range of values greater toward the plus side than a waveform peak value P1 of the load variation on contact or separation of the rollers (the intermediate transfer repulsion roller 5 and the secondary transfer roller 6). A waveform peak value P2 of the cam hitting variation is further greater toward the plus side than the waveform peak value P1 and falls in the threshold range. Accordingly, the home position can be accurately determined.

In another example, for the area determination (in a specific range) of FIG. 16B, the driving device and the load variation estimation device illustrated in FIG. 11 determine that the concave point of the deformed portion of the eccentric cam 9b has hit the secondary transfer roller 6, when the area of the load variation of each value, which is detected through the feedback control, in the specific range exceeds a predetermined threshold. Note that the predetermined threshold is also set to a value greater than a variation component on contact or separation of the rollers (the intermediate transfer repulsion roller 5 and the secondary transfer roller 6). For example, in a case in which the average value of all data of the values detected through the feedback control is assumed to be 0, the driving device and the load variation estimation device illustrated in FIG. 11 determine that the concave point of the deformed portion of the eccentric cam 9b has hit the secondary transfer roller 6, when the area enclosed by a specific range including a large load variation and 0 exceeds the predetermined threshold. After the determination of hitting by the detection of speed variation, the detection of the positional error is performed. When the positional error is detected, the occurrence position of the positional error or a position shifted from the occurrence position by several pulses can be determined as the home position. Thus, since the occurrence position of the load variation can be constantly fixed at one point, the detection of the load variation on the hitting of the cam can be more accurately performed than the detection of the load variation on contact and separation of the rollers (the intermediate transfer repulsion roller 5 and the secondary transfer roller 6).

Figure 17:
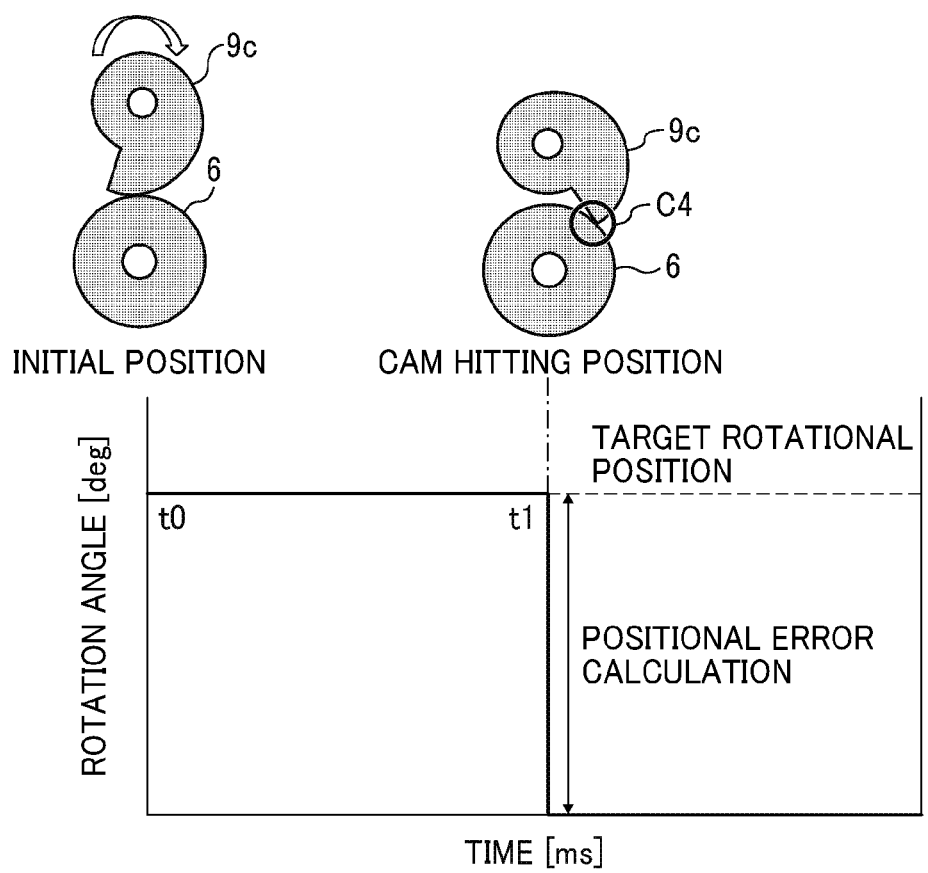
FIG. 17 is a diagram of characteristics of the rotation angle of the eccentric cam relative to the time to describe a positional error calculation through the cam hitting variation performed by applying the feedback control with the DC motor in a case in which the eccentric cam of FIG. 13D is employed.

FIG. 17 is a diagram of characteristics of the rotation angle [deg] of the eccentric cam 9c relative to the time [ms] to describe a positional error calculation through the cam hitting variation performed by applying the feedback control with the DC motor 3 in a case in which the eccentric cam 9c of FIG. 13D is employed.

With reference to FIG. 17, as described with reference to FIG. 13D, the flange-shaped point of the deformed portion of the eccentric cam 9a hits the secondary transfer roller 6 during rotation of the eccentric cam 9c. The speed and the positional error become zero and the eccentric cam 9c stops. In FIG. 17 is illustrated an example of detection of a positional error on the hitting. For example, time t0 indicates a position of the eccentric cam 9c on start-up. In this state, the rollers (the intermediate transfer repulsion roller 5 and the secondary transfer roller 6) are separated from each other. From this state, as the control processing described with reference to FIG. 14, the image forming apparatus 1000 is turned on and the eccentric cam 9c is driven in a direction indicated by arrow. In a time range from time t0 to time t1 in FIG. 17, a constant rotation amount (rotation angle) relative to time is obtained by driving of the DC motor 3.

When the eccentric cam 9c rotates to a position of time t1, as indicated by circle C4 in FIG. 17, the flange-shaped point of the deformed portion of the eccentric cam 9c hits the secondary transfer roller 6. At this time, since the eccentric cam 9c cannot further rotate, as illustrated in FIG. 17, the rotation amount rapidly falls to a small amount or zero. The positional error at this time is calculated from the values, such as current value, speed error, positional error, pulse width modulation (PWM), and torque, detected with the driving device and the load variation estimation device illustrated in FIG. 11 through the feedback control of the DC motor 3. The positional error from a target rotation position is calculated, and the hitting determination through detection of the speed variation is performed based on whether the calculated positional error is greater than a threshold. After the hitting determination through detection of the speed variation, another detection of a positional error is performed. When the positional error is detected, the occurrence position of the positional error or a position shifted from the occurrence position by several pulses can be determined as the home position. Thus, since the occurrence position of the load variation can be constantly fixed at one point, the detection of the load variation on the hitting of the cam can be more accurately performed than the detection of the load variation on contact and separation of the rollers (the intermediate transfer repulsion roller 5 and the secondary transfer roller 6).

Figure 18A:
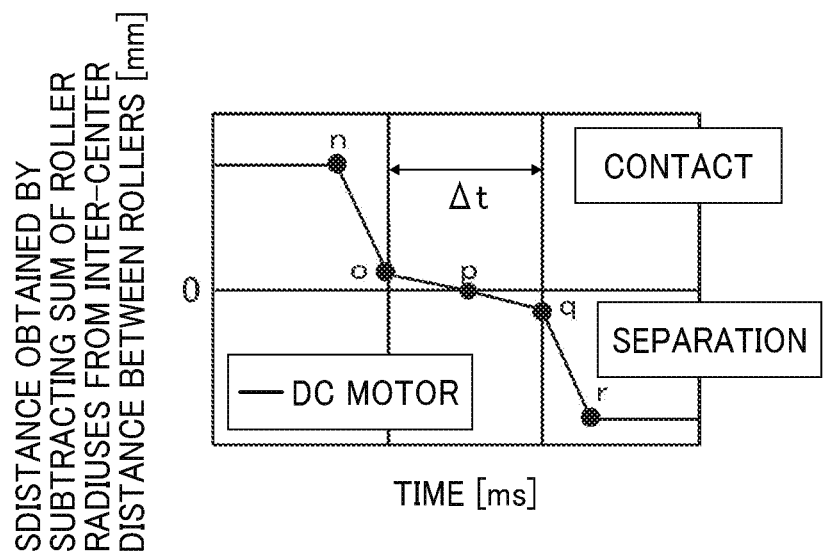
FIGS. 18A and 18B are graphs of the relationship of the distance obtained by subtracting the sum of radiuses of the rollers from the inter-center distance of the rollers relative to time, to illustrate a comparison of the drive time of the DC motor and the separation distance in the separating operation between the secondary transfer contact-and-separation device according to the first embodiment and the secondary transfer contact-and-separation device according to the second embodiment, more specifically.
Figure 18B:
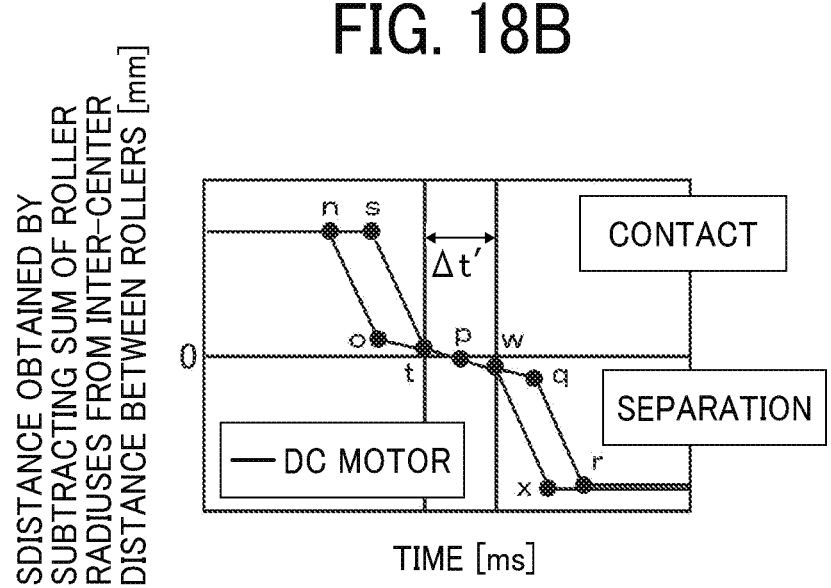

FIGS. 18A and 18B are graphs of the relationship of the distance [mm] obtained by subtracting the sum of radiuses of the rollers from the inter-center distance of the rollers relative to time [ms], to illustrate a comparison of the drive time of the DC motor 3 and the separation distance in the separating operation between the secondary transfer contact-and-separation device 200 according to the first embodiment and the secondary transfer contact-and-separation device 200 according to the second embodiment. FIG. 18A is a graph of a case in which the home position of the secondary transfer contact-and-separation device 200 according to the first embodiment deviates. FIG. 18B is a graph of a case in which the home position of the secondary transfer contact-and-separation device 200 according to the second embodiment is fixed at one point, in comparison with the secondary transfer contact-and-separation device 200 according to the first embodiment. Note that the rollers in this example are the intermediate transfer repulsion roller 5 and the secondary transfer roller 6.

With reference to FIG. 18A, for the secondary transfer contact-and-separation device 200 according to the first embodiment, as described with reference to FIG. 12, temporal variations may occur in contact and separation of the rollers (the intermediate transfer repulsion roller 5 and the secondary transfer roller 6) and the belt (the intermediate transfer belt 7). Accordingly, the home position might not be fixed at one point and, similarly, the contact position might also vary. To reduce the variations, it is preferable to increase the time range Δt from timing o of inflection at which the secondary transfer contact-and-separation device 200 transits from contact to separation via timing n at which a stable contact state ends to timing q of inflection immediately after separation via timing p of switching point, to reduce the speed on the contact and separation. Note that the separation state becomes stable when the secondary transfer contact-and-separation device 200 passes the timing q of inflection immediately after the separation and reaches timing r at which a stable separation state starts. If the time range Δt is too large, the conveyance speed of a sheet in an image forming apparatus would not be increased and a sufficient lead time would not be obtained, thus reducing the productivity.

By contrast, with reference to FIG. 18B, the secondary transfer contact-and-separation device 200 according to the second embodiment, as described above, can reduce temporal variations in contact and separation of the rollers (the intermediate transfer repulsion roller 5 and the secondary transfer roller 6) and the belt (the intermediate transfer belt 7). Accordingly, the home position can be fixed at one point and, similarly, variations of the contact position can also be prevented. A time range Δt' of FIG. 18B from timing t of inflection at which the secondary transfer contact-and-separation device 200 transits from contact to separation via timing s at which a stable contact state ends to timing w of inflection immediately after separation via timing p of switching point is set to be smaller than the above-described time range Δt of FIG. 18A. The time range Δt' indicates that the range in which the speed is reduced before and after contact and separation can be reduced. In addition, from FIG. 18B, it is found that a greater lead time can be obtained between timing n and timing s and between timing r and timing x. Note that the separation state becomes stable when the secondary transfer contact-and-separation device 200 passes the timing w of inflection immediately after the separation and reaches timing x at which a stable separation state starts. When the time range Δt' is small, a greater lead time can be obtained in an image forming apparatus. For example, the time interval between sheets can be reduced and the conveyance speed of a sheet can be increased, thus enhancing the productivity.

The respective functions according to the above-described embodiments of the present disclosure are realizable under a program written in C, C++, C#, Java (registered trademark) or the like and executable by a device. The program according to the present embodiment may be stored and distributed in the form of a recording medium, such as hard disk device, compact disk read-only memory (CD-ROM), magneto-optical disk (MO), digital versatile disk (DVD), flexible disk, electrical erasable programmable read-only memory (EEPROM), and erasable programmable read-only memory (EPROM), or received from other devices in a transmittable form via a network.

The present disclosure is described with reference to the example embodiments, but is not limited to the embodiments specifically described herein, and may be practiced otherwise without departing from the scope of modes occurring to those skilled in the art, as long as operations and effects of the present disclosure are offerable.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A contact-and-separation system comprising:
a first roller contacting a belt;
a second roller opposed to the first roller;
a contact-and-separation device to contact or separate the belt to or from the second roller via a sheet conveyed, the contact-and-separation device including:
an eccentric cam mounted on an end of a rotation shaft of the first roller;
a memory;

a motor to rotate the eccentric cam; and
a circuitry to control the motor to rotate the eccentric cam to contact or separate the belt to or from the second roller via the sheet conveyed, and to decelerate a rotation speed of the motor on contact or separation of the belt to or from the second roller between the first roller and the second roller,
wherein the circuitry is further configured to store, on the memory, data on a timing at which the circuitry determines that the contact-and-separation device has contacted the belt to the second roller, and wherein the circuitry is further configured to drive the contact-and-separation device so that the rotation speed of the motor in a period of time before and after the timing at which the contact-and-separation device has contacted the belt to the second roller is relatively lower than each of the rotation speed of the motor in moving the belt toward the second roller from a separation state in which the belt is separated from the second roller and the rotation speed of the motor in pressing the belt and the second roller to a contact pressure after the belt has contacted the second roller.

2. The contact-and-separation system according to claim 1,
wherein the circuitry is configured to perform feedback control of the rotation speed and a rotation angle of the motor.

3. The contact-and-separation system according to claim 1,
wherein the eccentric cam includes a deformed portion of a convex or concave shape.

4. The contact-and-separation system according to claim 3,
wherein the eccentric cam has a shape so that a load variation on hitting of the deformed portion on the second roller is relatively greater than another load variation on contact or separation of the belt to or from the second roller between the first roller and the second roller, and
wherein the circuitry is configured to decelerate the rotation speed of the motor at a timing based on the relatively greater load variation.

5. The contact-and-separation system according to claim 1, wherein the circuitry is disposed in a central processing unit of a host machine that conveys a recording medium.

6. An image forming apparatus comprising:
the contact-and-separation system according to claim 5; and
the central processing unit.

7. A contact-and-separation system comprising:
a first roller contacting a belt;
a second roller opposed to the first roller;
a contact-and-separation device to contact or separate the belt to or from the second roller via a sheet conveyed, the contact-and-separation device including:
an eccentric cam mounted on an end of a rotation shaft of the first roller;
a memory;
a motor to rotate the eccentric cam; and
a circuitry to control the motor to rotate the eccentric cam to contact or separate the belt to or from the second roller via the sheet conveyed, and to decelerate a rotation speed of the motor on contact or separation of the belt to or from the second roller between the first roller and the second roller,
wherein the circuitry is configured to store, on the memory, data on a timing at which the circuitry determines that the contact-and-separation device has separated the belt from the second roller, and
wherein the circuitry is configured to drive the contact-and-separation device so that the rotation speed of the motor in a period of time before and after the timing at which the contact-and-separation device has separated the belt from the second roller is relatively lower than each of a rotation speed of the motor in reducing a contact pressure of the belt and the second roller from a contact state in which the belt is in contact with the first roller and the second roller and a rotation speed of the motor in relatively increasing a distance between the first roller and the second roller after the belt separates from the second roller.

8. The contact-and-separation system according to claim 7, wherein the circuitry is disposed in a central processing unit of a host machine that conveys a recording medium.

9. An image forming apparatus comprising:
the contact-and-separation system according to claim 8; and
the central processing unit.

10. The contact-and-separation system according to claim 7,
wherein the circuitry is configured to perform feedback control of the rotation speed and a rotation angle of the motor.

11. The contact-and-separation system according to claim 7,
wherein the eccentric cam includes a deformed portion of a convex or concave shape.

12. The contact-and-separation system according to claim 11,
wherein the eccentric cam has a shape so that a load variation on hitting of the deformed portion on the second roller is relatively greater than another load variation on contact or separation of the belt to or from the second roller between the first roller and the second roller, and
wherein the circuitry is configured to decelerate the rotation speed of the motor at a timing based on the relatively greater load variation.

13. A contact-and-separation system comprising:
a first roller contacting a belt;
a second roller opposed to the first roller;
a contact-and-separation device to contact or separate the belt to or from the second roller via a sheet conveyed, the contact-and-separation device including:
an eccentric cam mounted on an end of a rotation shaft of the first roller;
a memory;
a motor to rotate the eccentric cam; and
a circuitry to control the motor to rotate the eccentric cam to contact or separate the belt to or from the second roller via the sheet conveyed, and to decelerate a rotation speed of the motor on contact or separation of the belt to or from the second roller between the first roller and the second roller,
wherein the circuitry is configured to store, on the memory, data on a timing at which the circuitry determines that the contact-and-separation device has contacted the belt to the second roller, and
wherein the circuitry is configured to drive the contact-and-separation device so that a pulse interval in a pulse section within a number of pulses before and after the timing at which the contact-and-separation device has contacted the belt to the second roller is relatively greater than each of a pulse interval in approaching the belt to the second roller from a separation state in which the belt is separated from the second roller and a pulse interval in pressing the first roller and the second roller to a contact pressure after the belt has contacted the second roller.

14. The contact-and-separation system according to claim 13, wherein the circuitry is disposed in a central processing unit of a host machine that conveys a recording medium.

15. An image forming apparatus comprising:
   the contact-and-separation system according to claim 14; and
   the central processing unit.

16. The contact-and-separation system according to claim 13,
   wherein the circuitry is configured to perform feedback control of the rotation speed and a rotation angle of the motor.

17. The contact-and-separation system according to claim 13,
   wherein the eccentric cam includes a deformed portion of a convex or concave shape.

18. The contact-and-separation system according to claim 17,
   wherein the eccentric cam has a shape so that a load variation on hitting of the deformed portion on the second roller is relatively greater than another load variation on contact or separation of the belt to or from the second roller between the first roller and the second roller, and
   wherein the circuitry is configured to decelerate the rotation speed of the motor at a timing based on the relatively greater load variation.

* * * * *